US008548465B2

(12) United States Patent
Mueck et al.

(10) Patent No.: US 8,548,465 B2
(45) Date of Patent: Oct. 1, 2013

(54) METHODS AND APPARATUS FOR PROVIDING DYNAMIC INFORMATION IN A WIRELESS INFORMATION CHANNEL

(75) Inventors: Markus Mueck, Unterhaching (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 574 days.

(21) Appl. No.: 12/766,806

(22) Filed: Apr. 23, 2010

(65) Prior Publication Data

US 2011/0263250 A1 Oct. 27, 2011

(51) Int. Cl.
*H04W 4/00* (2009.01)

(52) U.S. Cl.
USPC .......................................... 455/434; 370/329

(58) Field of Classification Search
USPC ................. 455/434, 507–509, 444, 436, 517, 455/561; 370/329
See application file for complete search history.

(56) References Cited

U.S. PATENT DOCUMENTS

| | | | |
|---|---|---|---|
| 7,613,147 B2* | 11/2009 | Bergenlid et al. | ............. 370/329 |
| 2007/0133484 A1 | 6/2007 | Albal et al. | |
| 2007/0211661 A1* | 9/2007 | Tee et al. | ....................... 370/329 |
| 2009/0073911 A1 | 3/2009 | Cheon et al. | |
| 2009/0081944 A1* | 3/2009 | Yavuz et al. | .................. 455/3.01 |
| 2009/0186646 A1* | 7/2009 | Ahn et al. | ...................... 455/509 |
| 2009/0264126 A1* | 10/2009 | Khetawat et al. | ......... 455/435.1 |
| 2010/0113083 A1* | 5/2010 | Luo et al. | ....................... 455/515 |
| 2011/0026503 A1 | 2/2011 | Mueck et al. | |
| 2011/0070885 A1* | 3/2011 | Ruuska et al. | ................. 455/434 |
| 2011/0085493 A1* | 4/2011 | Chang et al. | .................. 370/328 |
| 2011/0103301 A1* | 5/2011 | Mueck et al. | ................. 370/328 |
| 2011/0124374 A1* | 5/2011 | Sagae et al. | .................... 455/561 |
| 2011/0130164 A1* | 6/2011 | Sagae et al. | .................... 455/517 |
| 2011/0183703 A1* | 7/2011 | Sagae et al. | .................... 455/522 |

(Continued)

FOREIGN PATENT DOCUMENTS

| | | |
|---|---|---|
| WO | WO 01/77903 | 10/2001 |
| WO | WO 2007/069988 | 6/2007 |
| WO | WO 2009/039436 | 3/2009 |
| WO | WO 2009/148393 | 12/2009 |

OTHER PUBLICATIONS

Cooperative Spectrum Sensing Technique Based on Sub Space Analysis for Cognitive Radio Networks, Bassem Zayen and Aawatif Hayar, Mobile Communications Group, Institut Eurecom, 5 pages.

(Continued)

*Primary Examiner* — Kamran Afshar
*Assistant Examiner* — Khawar Iqbal
(74) *Attorney, Agent, or Firm* — Fay Kaplun & Marcia, LLP

(57) ABSTRACT

Methods and apparatus for transmission of selected segments of information (such as system context information). In one embodiment, a cognitive pilot channel base station (CPC-BS) is disclosed that enables the distribution of context information to various user equipment and mobile devices in an efficient manner. The exemplary CPC-BS is also optionally capable of distributing sensing tasks to external entities, and compiling the data results from these distributed tasks for use in performing future CPC transmissions based e.g., on the operational mode of the system. On-demand provisioning of context information over both broadcast and peer-to-peer communications with served users is also disclosed. In addition to the distribution of context information via the use of a single CPC-BS, master-slave relationships between multiple CPC-BSs are also described, which permit for a distributed architecture in providing context information to served users.

12 Claims, 16 Drawing Sheets

(56) References Cited

U.S. PATENT DOCUMENTS

2011/0244904 A1* 10/2011 Sagae et al. .................. 455/507
2012/0108247 A1*  5/2012 Tring et al. .................. 455/446
2012/0142293 A1*  6/2012 Mueck et al. ................. 455/130

OTHER PUBLICATIONS

Binary Power Allocation for Cognitive Radio Networks with Centralized and Distributed User Selection Strategies, Bassem Zayen, et al., Physical Communication 1 (2008) 183-193, journal homepage: www.elsevier.com/locate/phycom.

Multiple Access-Inspired Cooperative Spectrum Sensing for Cognitive Radio, Chia-han Lee and Wayne Wolf, IEEE, 6 pages, Oct. 29, 2007 XP031232378.

Reconfigurable Radio Systems (RRS); Cognitive Radio System Concept, ETSI TR 102 802, V0.1.2 (Dec. 2009), Technical Report, 30 pages.

*A Novel On-Demand Cognitive Pilot Channel Enabling Dynamic Spectrum Allocation*, Perez-Romero, J.; Salient, O.; Agusti, R.; Giupponi, L., New Frontiers in Dynamic Spectrum Access Networks, 2007, DySPAN 2007. $2^{nd}$ IEEE International Symposium on Apr. 17-20, 2007, pp. 46-54.

"*IEEE Standard for Architectural Building Blocks Enabling Network-Device Distributed Decision Making for Optimized Radio Resource Usage in Heterogeneous Wireless Access Networks*", IEEE P1900.4 published on Feb. 27, 2009, pp. 1-131.

*Development of a Radio Enabler for Reconfiguration Management within the IEEE P1900.4 Working Group*, Holland, O.; Muck, M.; Martigne, P.; Bourse, D.; Cordier, P.; Ben Jemaa, S.; Houze, P.; Grandblaise, D.; Klock, C.; Renk, T.; Jianming Pan; Slanina, P.; Mobner, K.; Giupponi, L.; Romero, J.P.; Agusti, R.; Attar, A.; Aghvami, A.H.; New Frontiers in Dynamic Spectrum Access Networks, 2007. DySPAN 2007. $2^{nd}$ IEEE International Symposium on Apr. 17-20, 2007, pp. 232-239.

IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands and Corrigendum 1", pp. 1-864.

* cited by examiner

METHODS AND APPARATUS FOR PROVIDING DYNAMIC INFORMATION IN A WIRELESS INFORMATION CHANNEL

CROSS-REFERENCE TO RELATED APPLICATIONS

This application is related to co-owned and co-pending U.S. patent application Ser. No. 12/512,761 filed Jul. 30, 2009 and entitled "Methods and Apparatus for Providing Dynamic Information in a Wireless Information Channel" as well as co-owned and co-pending U.S. patent application Ser. No. 12/611,715 filed Nov. 3, 2009 and entitled "Methods and Apparatus for Reception of Dynamic Information by Inactive Receivers," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the invention is directed to methods and apparatus for providing selected segments of system contextual information.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

Information and Pilot Channels—

Information channels (such as Pilot Channels) are used in many prior art cellular mobile radio communication systems. Such channels provide user equipment (UE) with useful information such as for example broadcasts of basic system information. Such information may be crucial during, inter alia, initial "wake-up" and registration, estimating potential base station (BS) service reception for handover (i.e. handoff), etc. Various approaches to information (e.g., pilot) channel messaging are evidenced throughout the prior art. For example, in Interim Standard 95 (IS-95, CDMA), a pilot channel is used by mobile devices to initially determine the existence of base stations, and/or support multipath compensation.

Unfortunately, such information channels have a relatively high cost in terms of bandwidth when compared to other useful data channels. Generally speaking, these channels are the most robust and simplest coded channels of the network. When compared to the rest of the network bandwidth utilization (which is densely coded), the information distribution (pilot) resources are significantly underutilized. In some cases, a cellular pilot channel may use up to one-fifth of the overall spectral resources, while providing little to no additional information to the user equipment (UE) population during normal operation.

Recently, significant research has been conducted to improve the utilization of information and pilot channels. For example, proposed improvements to pilot channels increase the information capacity of pilot channel messaging. FIG. 1 illustrates a so-called Radio Enabler (RE) of Reconfiguration Management that was introduced in order to distribute context information to user equipment/mobile devices (UEs/MDs). However, the work relating to the definitions associated with the RE remain at a high level of abstraction, with little or no implementation related details given.

Furthermore, the IEEE 802.22 standard has defined a Cognitive Radio (CR) system targeting a future usage in the various so-called "White Spaces" which will become available upon the switch-off of analog TV broadcasts. In the framework of this standard, a sub-group called IEEE 802.22.1 has defined a dedicated physical channel for the distribution of contextual information transmitted in a beacon frame as illustrated at FIG. 2. However, this standard only defines a rather simplistic frame structure with rather limited capabilities for being deployed across alternative air interfaces. Other frame formats, such as that illustrated in FIG. 3 and disclosed in *A Novel On-Demand Cognitive Pilot Channel Enabling Dynamic Spectrum Allocation*. Perez-Romero, J.; Salient, O.; Agusti, R.; Giupponi, L., New Frontiers in Dynamic Spectrum Access Networks, 2007. DySPAN 2007. $2^{nd}$ IEEE International Symposium on Apr. 17-20, 2007, pages 46-54, has also been disclosed for the transmission of contextual information.

Despite the foregoing, improved methods and apparatus are needed for more efficiently allocating and using information or pilot channel resources. Ideally, such methods and apparatus would allow for the independent deployment of contextual information providers to existing networks. Furthermore, such improved methods and apparatus would also allow for the intelligent bundling and distribution of contextual information to various users and devices that can take advantage of that information.

SUMMARY OF THE INVENTION

The present invention satisfies the aforementioned needs by providing, inter alia, improved apparatus and methods for transmitting system information, such as via a pilot or other information channel.

In a first aspect of the invention, a method for transmitting context information in a wireless network is disclosed. In one embodiment, the method includes: causing request of context information from one or more portable devices associated with the wireless network to be issued; receiving the context information from the one or more portable devices substantially in response to the request; assigning a sensing task to at least one of the one or more portable devices based at least in part on the received context information; receiving data associated with the sensing task from the at least one of the one or more portable devices; and transmitting the data associated with the sensing task to at least one of the portable devices if at least one of the portable devices includes a registered user.

In one variant, the transmitting further includes transmitting at least a portion of the received context information along with the data associated with the sensing task.

In another variant, the at least a portion of the received context information and the data associated with the sensing task are transmitted in a substantially common data structure.

In a further variant, the at least a portion of the received context information and the data associated with the sensing task are transmitted in one or more data structures having a toggled preamble.

In yet another variant, the method further includes detecting one or more portable devices in a coverage area.

In still another variant, the one or more portable devices from which the data associated with the sensing task is received comprise the at least one portable device.

In a further variant, the received context information is related to at least one of: (i) Packet Error Rate (PER), (ii) link quality, (iii) quality of service (QoS), and/or (iv) jitter/packet loss rate or fraction.

In a second embodiment, the method includes: receiving requests for context information from respective ones of user devices within the network; identifying a common transmission mode for the context information based at least in part on the one or more requests; aggregating a plurality of context information elements into a common data set; and transmitting the common data set to the respective ones of the user devices using the common transmission mode.

In one variant, the common transmission mode includes a broadcast, and the common data set is provided to all users in a coverage area or individual network mesh.

In another variant, the common transmission mode includes a multicast, and the common data set is provided to only a subset of users in a coverage area or individual network mesh.

In a further variant, the receiving requests for context information from respective ones of user devices within the network includes receiving the requests at different times, and the method further includes waiting for a delay period before the transmission of the common data set.

In yet another variant, the network includes a cellular network (e.g., LTE), the act of transmitting is performed by a cognitive pilot channel base station (CPC-BS).

In another variant, the identification of a common transmission mode for the context information based at least in part on the one or more requests is made for individual ones of a plurality of requested context information elements.

In yet a further variant, the identification of a common transmission mode for the context information based at least in part on the one or more requests is based at least in part on a level of service associated with individual ones of the requesting user devices.

In a second aspect of the invention, a context-adaptive base station is disclosed. In one embodiment, the base station is for use in a wireless network, and includes: a processing apparatus coupled to both a storage medium and a wireless network interface, the storage medium having at least one computer program stored thereon. The at least one computer program that, when executed by the processing apparatus: store requests from one or more portable devices, the requests comprising a request for context information from the base station; determine whether a response to the request for context information should be transmitted; and where the determination indicates that a response should be transmitted, transmit the response.

In one variant, the response is transmitted according to a determined message type, where the determined message type is selected from the group consisting of: a broadcast type, a multi-cast type and a unicast type.

In another variant, the determination of whether a response should be transmitted includes: determination of the geographic location of one or more of the requests; and evaluation of the need for context information based at least in part on the geographic location.

In a second variant, the determination of whether a response should be transmitted includes determination of the operational mode of the network. The operational mode is e.g., selected from the group consisting of: (i) a mode where the base station has knowledge about its served portable devices; (ii) a mode where the base station has no knowledge about its served portable devices; and (iii) a mode where the base station has knowledge about only some of the served portable devices.

In another variant, the at least one computer program is further configured to: receive first context information from the one or more portable devices; and determine whether the first context information requires update. Where the first context information requires update, the transmission of the response is initiated. The transmission of the response includes e.g., sending only a changed or updated portion of the context information.

In another variant, the wireless network includes a cellular network, and the changed or updated portion of the context information is transmitted via a pilot channel resource of the cellular network.

In a third aspect of the invention, a context information system for use in a wireless network is disclosed. In one embodiment, the system includes: a master context information base station; a slave context information base station; and a portable device configured to receive context data from both the master context information base station and the slave context information base station. The context data received is prioritized by the portable device based on e.g., the context information base station type that transmitted the context data.

In one variant, the slave context information base station provides context data over a substantially smaller coverage area as compared with the master context information base station.

In another variant, if a first portion of the received context data conflicts with a second portion of the received context data, the first portion of the received context data is retained or discarded based at least in part on a prioritization of the first and second portions of the context data. The first portion of the received context data is e.g., generated by the master base station, and the second portion of the received context data is e.g., generated by the slave base station, and the first portion of the received context data is retained based at least in part on prioritization of the master base station over the slave base station.

Alternatively, in another variant, the first portion of the received context data is received at a first time, and the second portion of the received context data is generated at a second time earlier than the first time, and the first portion of the received context data is retained based at least in part on prioritization of the more recent first portion.

In a fourth aspect of the invention, a method of conserving information channel resources within a wireless network is disclosed. In one embodiment, the network is a cellular network, and the information channel is a cognitive pilot channel (CPC). A dedicated CPC base station is employed to selectively deliver context information to all or a subset of wireless users in the network based on factors such as their subscription level, their need for the information, their geographic location, etc.

In a fifth aspect of the invention, a base station apparatus adapted to conserve information channel resources within a wireless network is disclosed. In one embodiment, the base station is configured to: receive context information from one or more requesting mobile devices; determine if the received context information requires updating; and where updating is required, selectively encode a preamble of a message sent over the information channel so as to notify at least one of the one or more requesting mobile devices that decoding of at least a portion of the body of the message is required in order to update the context information.

In another embodiment, the base station is configured to: receive context information from one or more requesting mobile devices; determine if the received context information requires updating; and based at least in part on the determination, selectively encode a preamble of a message sent over the information channel so as to allow at least one of the one or more requesting mobile devices to determine whether or not decoding of at least a portion of the body of the message is appropriate for them individually.

In a sixth aspect of the invention, business methods associated with the aforementioned apparatus and methodologies are disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
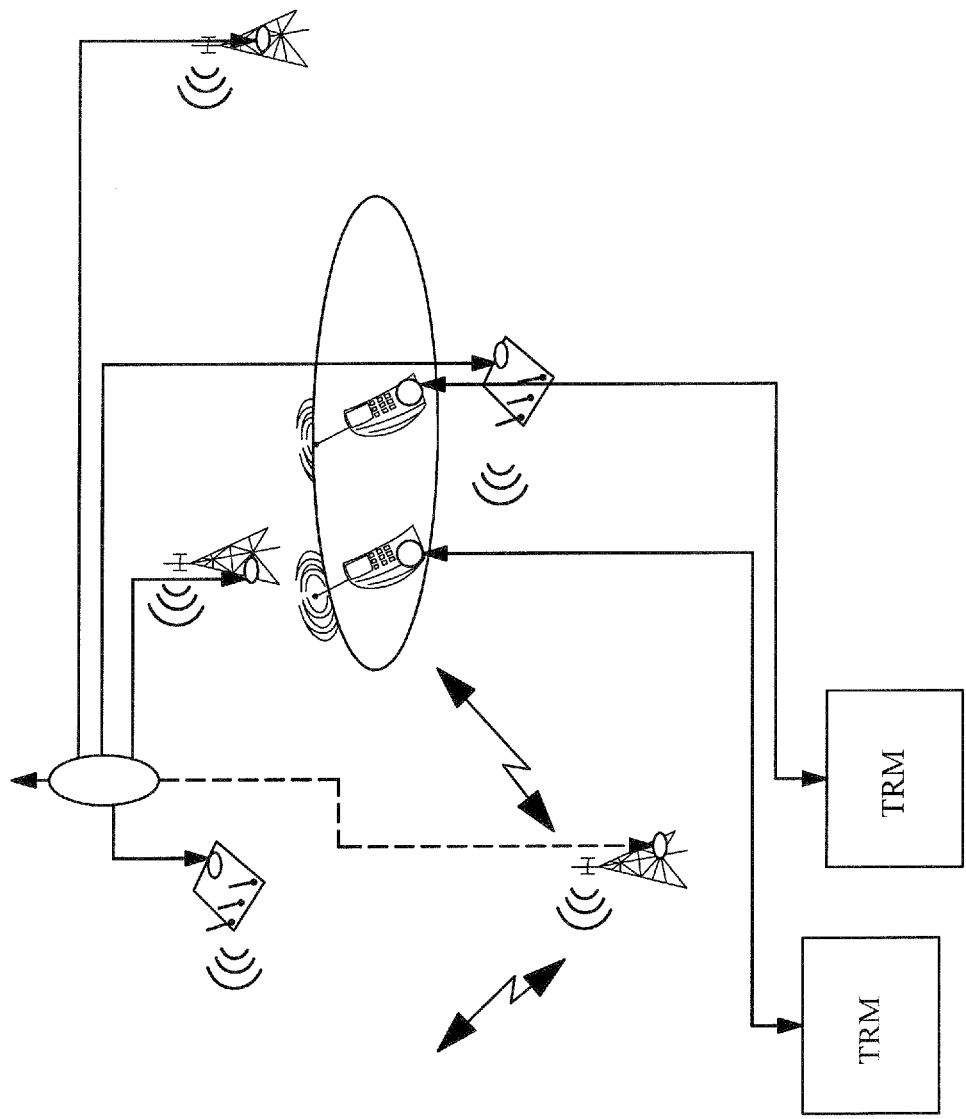
FIG. 1 is a graphical representation of an exemplary prior art Radio Enabler as defined by IEEE SCC 41/IEEE P1900.4.
Figure 2:
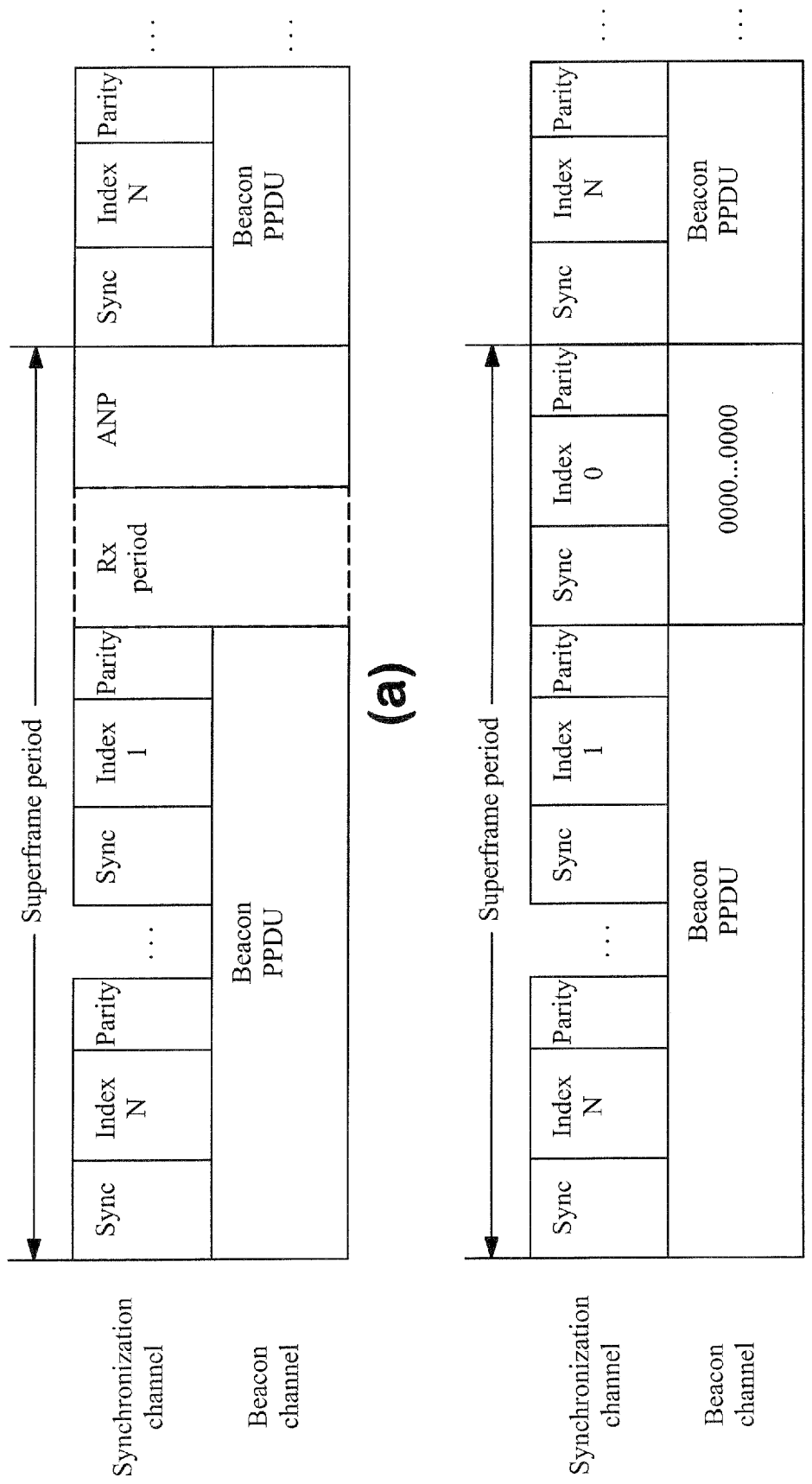
FIG. 2 is a graphical representation of an exemplary prior art Beacon Frame as defined by IEEE 802.22.1.
Figure 3:
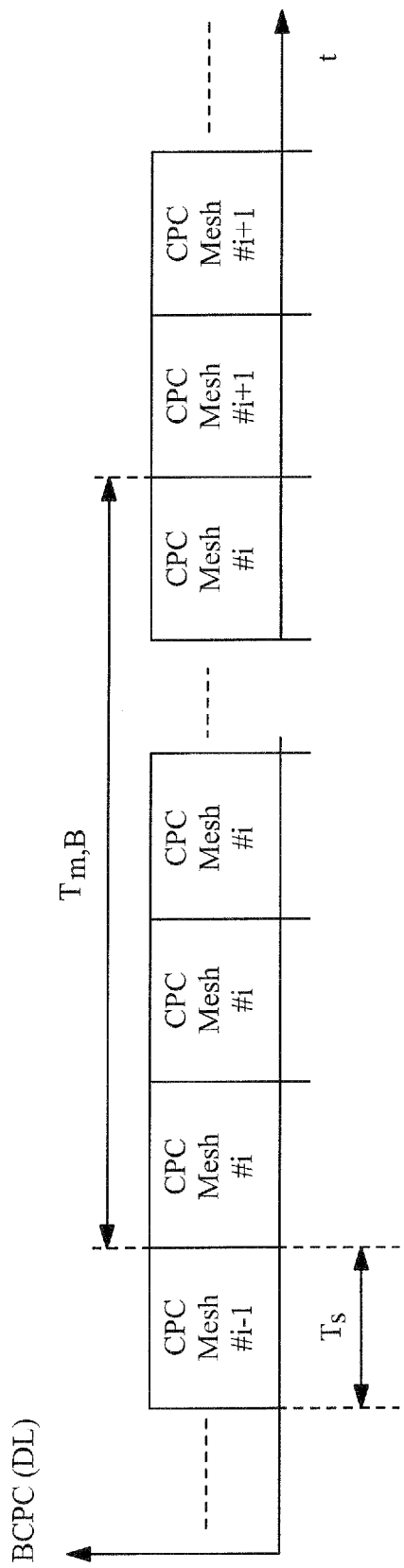
FIG. 3 is a graphical representation of an exemplary prior art CPC-on-demand frame.

Reference is now made to the drawings, wherein like numerals refer to like parts throughout.

Overview

The present invention discloses, inter alia, methods and apparatus for transmission of selected segments of information (such as system context information) onto a network. The exemplary embodiments of the invention in one aspect disclose a new infrastructure device (cognitive pilot channel-base station, or CPC-BS). The CPC-BS apparatus enables the automated distribution of context information to various mobile and other devices (e.g., UEs) within the coverage area of the CPC-BS. In addition, the CPC-BS is capable of distributing sensing tasks to external entities, and compiling the data results from these distributed tasks for use in future CPC transmissions. This approach results in, among other things, more efficient resource use within the network.

The exemplary CPC-BS is also capable of determining the operational mode of the system, and adjusting its behavior accordingly. These operational modes include for example situations in which: (i) the CPC-BS has knowledge about its served users; (ii) the CPC-BS has no knowledge about its served users; and (3) a mixture of served users exists; i.e., the CPC-BS has knowledge about only some of the served users.

In another aspect, the CPC-BS is configured such that its coverage area is optimized for specifically addressing target devices that it is serving. This functionality is accomplished via the use of, for example, beamforming transmission techniques. The use of these beamformed transmissions can occur either: (1) over the entire CPC frame; or (2) by splitting portions of the CPC frame among various interested users.

The CPC-BS is, in some disclosed embodiments, capable of on-demand provisioning of context information over both broadcast and peer-to-peer communications with served users, as well as adjusting the granularity of the coverage information it provides based on, for example, the geographical distribution of its served users.

Furthermore, in addition to the distribution of context information via the use of a single CPC-BS, master-slave relationships between CPC-BS are also disclosed which permit for a distributed architecture in providing context information to served users of the system.

DETAILED DESCRIPTION OF EXEMPLARY EMBODIMENTS

Exemplary embodiments of the present invention are now described in detail. While these embodiments are primarily discussed in the context of a third generation UMTS wireless network (3G), and more specifically in one variant to LTE (3.9G) and fourth generation LTE-A (4G) networks, it will be recognized by those of ordinary skill that the present invention is not so limited. In fact, the various aspects of the invention are useful in any wireless network that can benefit from the configurable segmented public broadcast mechanisms described herein including, without limitation, any wireless signal, data, communication, or other interface such Wi-Fi, IEEE 802.11ac, IEEE 802.11ad, Bluetooth, Zigbee, Wireless USB, 3G (e.g., 3GPP, GSM, EDGE, 3GPP2, and UMTS), HSDPA/HSUPA, HSxPA+, LTE, LTE-Advanced, TDMA, CDMA (e.g., IS-95A, WCDMA, etc.), PAN/802.15, WiMAX (802.16), 802.20, OFDM, OFDMA, SC-OFDMA, PCS/DCS and TV White Space Standards (e.g., IEEE 802.22, IEEE 802.11af, IEEE 802.19, IEEE SCC41 and ETSI RRS, etc.), DVB-T, DVB-H, PAN IEEE 802.15(.x), American digital TV standards, satellite telephone standards, etc.

Furthermore, the embodiments described herein are also particularly useful in a strongly heterogeneous context (e.g., in scenarios where cellular technologies such as 3GPP UMTS, HSxPA, etc. are also available in parallel with other radio access technologies (RATs) such as WiMAX IEEE 802.16e, WiFi IEEE 802.11a/b/g/n, Bluetooth, ZigBee, Satellite telephone systems, DVB-T, DVB-H, etc.). The use of context provision channels enables UEs to operate more efficiently in diverse, heterogeneous environments, although it is recognized that the various aspects of the invention are useful in contexts outside of heterogeneous environments.

Moreover, as used herein, the terms "segmented public broadcast information", "segmented publicly broadcast", "segmented pilot channel", and "Cognitive Pilot Channels (CPC)" refer to any type of transmission which is received by one or more generalized user groups in a wireless communication network, or parts thereof. Such generalized user groups may include for example groups formed around user class, subscription type, location, etc. Segmented public broadcasts may not be of interest to all users, yet they may be useful for any user. Accordingly, such segmented public broadcasts are generally not "addressed" to any specific user(s). The following examples are helpfully provided to further clarify publicly broadcast information.

Segmented public broadcast information may be segmented by user class, e.g. by subscriber status. For example, one such exemplary scheme would designate "gold" and "silver" users, each of which is provided different services (or levels of the same service). Accordingly, in one variant, information transmitted for "gold" users, may not be received and/or decoded by "silver" users, and vice versa. For example, a given CPC frame may possess context information for multiple user classes. Within this given CPC frame, a privileged subscriber (e.g. "gold" level status) would possess the ability to decode the entire CPC frame, while lower level subscribers might only possess the ability to decode portions of that same CPC frame. Alternatively, the CPC frame itself might correspond directly to subscriber status such that one CPC frame might be targeted at and for "gold" users only, while another CPC frame might be specifically targeted at and for "silver" users only, etc. Various other schemes will be readily appreciated by those of ordinary skill given the present disclosure.

Segmented public broadcast information may require a subscription for reception. For example, a mobile network operator, or alternatively a third party service provider (i.e., different from the mobile network operator) may provide supplemental service, and a corresponding CPC service. Wi-Fi™ hotspots are one common example of such third party service providers. Users interested in receiving the supplemental services may also choose to receive the corresponding CPC service. Uninterested users may simply ignore the CPC service.

Segmented public broadcast information may be localized, or geographically limited in use. For example, a hospital may implement a segmented public broadcast that force UEs to reduce their output power. Similarly, segmented public broadcast information may be useful only in certain directions, or at cell boundaries (e.g., to facilitate handoff). As another example, a theater or opera house may require that a mobile device ringtone be automatically switched off by such a CPC that addresses only those devices that are inside the theater or opera house. As yet another example, an airline may wish to restrict the output power of a UE in order avoid possible interference problems between users of these UE on one of their airplanes from interfering with the plane's flight control or communication systems.

In some embodiments, segmented public broadcast information may be ordered "on-demand". For example, a base station may operate in legacy mode normally, but while invention-enabled UEs are within the service area of the base station, the UEs may request segmented CPC transmissions to optimize network operation. The base station adjusts its service accordingly. Alternately, an invention enabled base station may provision various segments of an existing CPC transmission in an on-demand manner. For example, a UE may request a particular segment of CPC transmission; thereafter, the CPC-BS provides the requested segment within its segmented public broadcast.

Various other aspects of segmented public broadcasts, segments of context information, and their respective uses, etc. will be apparent to those skilled in the arts, given the present disclosure.

Exemplary Cellular Network Architecture—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected by another network (in many cases a wired network), which includes additional controllers for resource management and in some cases access to other network systems (such as the Internet or MANS).

In a UMTS system, a base station is commonly referred to as a "NodeB". The UMTS Terrestrial Radio Access Network (UTRAN) is the collective body of NodeBs along with the UMTS Radio Network Controllers (RNC). The user interfaces to the UTRAN via a UE, which in many typical usage cases is a cellular phone or smartphone. However, as used herein, the terms "UE", "client device", and "end user device" may include, but are not limited to, cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as e.g., handheld computers, PDAs, personal media devices (PMDs), such as for example an iPod™, or any combinations of the foregoing.

Figure 4:
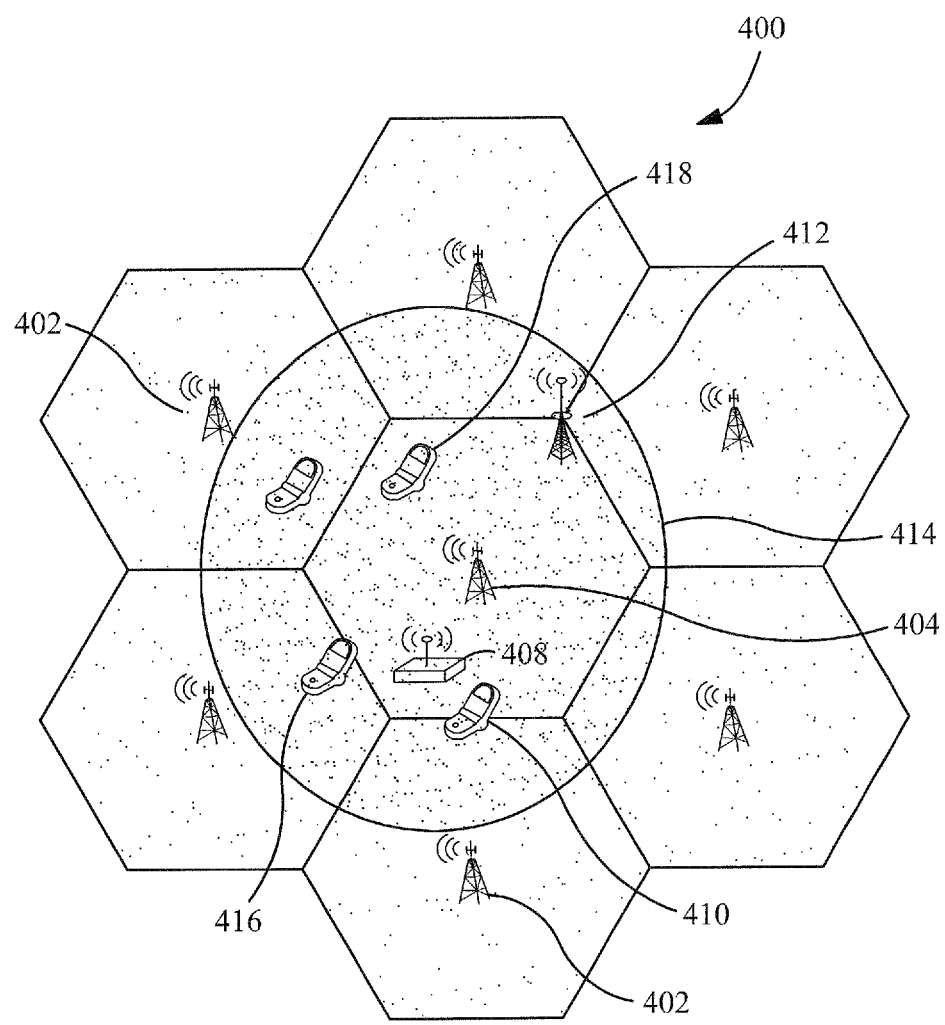
FIG. 4 is a graphical representation of an exemplary heterogeneous Radio Access Network (RAN) providing a cognitive pilot channel base station (CPC-BS) framework, implementing one or more aspects of the present invention.

LTE networks are based on their UMTS predecessors, and sometimes referred to as 3.9G networks. FIG. 4 illustrates an exemplary LTE cellular system 400 in accordance with the principles of the present invention, with a focus on the radio access network (RAN). The system 400 includes one or more base station towers 402 (also known as enhanced-NodeBs (eNBs)), that are set at various fixed geographic locations. Such eNBs may also be generally referred to as a "macrocell".

Furthermore, LTE standards have provisioned for the operation of a new network entity, the Home enhanced-NodeB (HeNB) 404, which is a miniaturized version of an eNB. The HeNB is also commonly referred to as a "femtocell"; a femtocell provides similar functionality to a macrocell, but at a reduced capability and cost, and may be portable versus fixed. Femtocells may be purchased by a customer for personal use. The combination of eNBs and HeNBs provide a seamless cohesive service from a network operator. The network operator manages network operation via a Core Network (not shown). The unified Core Network provides authentication, accounting, and authorization (AAA) services, and in some cases, access to external networks (e.g. such as IP Multimedia Subsystems (IMS) services as specified by the 3GPP).

Each of the eNBs 402 and HeNBs 404 are directly coupled to the Core Network e.g., via broadband access. Additionally, in some networks the eNBs may coordinate with one another, via secondary access. In the illustrated RAN 400 of FIG. 4, the HeNBs are connected to the Core Network, but are not linked to the other entities of the network (e.g., the eNBs). In other network embodiments, HeNB-eNB connections may be implemented. Unlike the broader coverage of the eNBs, an HeNB is generally focused on improving service to a few subscribers. Accordingly, HeNBs may have settings and limitations which are not applicable for the general population. Such non-standard settings are generally disclosed, at least in part, within the pilot channel public broadcasts. Accordingly, the eNB and the HeNB generally have different pilot channel payloads (e.g., context information).

Furthermore, also shown in FIG. 4 is an out-of-network service, provided by a Wireless Local Area Network (WLAN) ad hoc network 408. Such ad hoc networks are not coupled to any higher entity, and widely vary in services provided, authentication, authorization, etc. Accordingly, the ad hoc network has significantly different pilot channel information from either the eNBs 402 or the HeNBs 404.

Ideally, neighbouring base stations having overlapping coverage areas should peacefully coexist, and work to minimize Intra-Cell Interference (ICI). Thus, when a UE enters a region of overlapping service, the UE may select (or be transferred) to the optimal base station; e.g., the base station which minimizes transmit and receive power, or optimizes one or more other parameters. Similarly, in mixed networks (i.e., where multiple networks coexist), the UE should efficiently select from the available resources of the disparate networks. While a UE may maintain links to multiple distinct networks to maximize the overall UE data rates, more commonly the UE will choose (or be triggered to perform a "vertical handover" to) the stronger radio link. Vertical handovers are significantly more complex than typical handovers. A vertical handover generally requires a complete shift from one radio access technology to another. Vertical handovers are also referred to as "Inter-Radio Access Technology (Inter-RAT) Handovers" in 3GPP terminology.

FIG. 4 also illustrates a new type of equipment known as a CPC Base Station 412 (CPC-BS). Such an apparatus advantageously allows for (but does not mandate) the deployment of a new CPC network that is otherwise not linked to existing cellular network architecture, thereby allowing for an operator-independent deployment approach. It is recognized however that in some embodiments, it may be desirable that the CPC network be part of the existing cellular system 100, either in whole or in part. The CPC-BS 412 with its coverage area 414 can then supplement the LTE cellular system 100 by providing context information to UEs 410, 416, and 418 during, inter alia, inter-RAT cell re-selection or during vertical handovers from a current network to a "new" network.

Implementation solutions for this new type of equipment 412 may include for example situations in which: (i) the CPC-BS has knowledge about served users via the identification of target UEs or mobile devices (MDs); (ii) the CPC-BS has no knowledge about served users; or (iii) a mixture of both modes exists; i.e. where the CPC-BS has partial knowledge about served users.

Cognitive Radio—

"Cognitive radio" is a term generally used to describe a network or wireless node which intelligently alters its wireless communication to, inter alia, avoid interference. Cognitive radio may actively monitor several factors in the external and internal radio environment (such as radio frequency spectrum, user behavior, network state, etc.).

The computational complexity of much cognitive radio theory has rendered its implementation impractical in the past. However, recent advances in the digital electronics arts have greatly contributed to modern cognitive radio developments. For example, significant research has already been conducted on so-called Cognitive Pilot Channels (CPCs). Accordingly, the incipient standards for advanced radio networks have proposed that a CPC should comprise a context provisioning signal for any legacy and future Radio Access Technologies (including LTE).

To this end, one aspect of the present invention relates to improvements to the proposed Cognitive Pilot Channel (CPC).

In one embodiment of the invention, each UE selectively decodes portions (or segments) of the CPC. When a UE is uninterested in the current CPC, its resources may be allocated for other services (e.g., transmission or reception of data). A population of invention-enabled UE devices can remain quiescent during the majority of CPC transmissions; each UE may individually decode at least parts of the CPC for information of interest. Furthermore, selective decoding of the CPC also enables CPC transmissions which are a subset of the comprehensive CPC context information set.

For example, one illustrative embodiment of an improved CPC rotates through varying portions of the context information for transmission. A first portion of the context information may rarely change (e.g., parameters of cellular networks), while other portions may change quite frequently (e.g. the load level of WLAN systems). Consequently, in one implementation, a UE which is newly acquiring the CPC decodes the entire CPC so as to obtain all relevant information. However, UEs which have been camping (i.e., in RRC_IDLE state), or operating for some time (i.e., RRC_CONNECTED) on the same cell or in the same geographical area, will have already decoded the "old" context information, and need only to recover the latest updates or changes.

The CPC-BS may dynamically broadcast segments of information of varying priority, where the segmented broadcast information is scheduled or selected for broadcast based on the priority of the information (e.g., highest priority scheduled first and/or most frequently). In addition, one embodiment of the CPC-BS selectively recovers context information from the population of UEs, and efficiently distributes information and tasks to the population of UEs (including for example the software defined radio (SDR) UE described in co-owned and co-pending U.S. patent application Ser. No. 12/512,761 filed Jul. 30, 2009 and entitled "Methods and Apparatus for Providing Dynamic Information in a Wireless Information Channel", and U.S. patent application Ser. No. 12/611,715 filed Nov. 3, 2009 and entitled "Methods and Apparatus for Reception of Dynamic Information by Inactive Receivers", each of which are incorporated herein by reference in their entirety) in order to operate the CPC network in an efficient manner. While the SDR UE and CPC-BS are complementary, and will generally provide optimized performance when used in tandem, they can also independently operate with increased efficiency over legacy devices (e.g., a SDR UE may efficiently receive broadcasts from BS other than CPC-BS, and a CPC-BS may efficiently utilize pilot channel resources with non-enabled UEs).

The aforementioned improvements to the Cognitive Pilot Channel (CPC) more generally, and CPC-BS entities in particular, are now discussed in greater detail.

Exemplary Cognitive Pilot Channel—

Extant modes of CPC operation in a UMTS/LTE network are divided into two categories: (i) "dedicated" CPCs (CPC), and (ii) "virtual" CPCs (V-CPC). A dedicated CPC relies on a dedicated physical channel, or radio resource, for the transmission of CPC information. In contrast to dedicated CPCs, a V-CPC encapsulates the CPC content within one or more generic radio resources (i.e., the V-CPC is treated as a data payload). V-CPCs are significantly more flexible than traditional dedicated CPCs, and are network-agnostic (i.e., may be used to span different networks). As used herein, the terms "CPC" and "V-CPC" describe implementation-specific embodiments, and are interchangeable in functionality (i.e., where a V-CPC is described, it will be recognized that a CPC may be substituted, and vice versa).

In one aspect of the present invention, a Cognitive Pilot Channel (CPC) is disclosed which modulates or controls its bandwidth for pilot channel messaging. Improvements to pilot channel operation afforded by the invention are applicable for both CPCs and V-CPCs. For a dedicated CPC, any freed dedicated resources may be used for the transmission/ reception of other services (e.g., data), or may be "put to sleep" to reduce power consumption or processing overhead. For a V-CPC, freed bandwidth is typically reclaimed for other data services, but other approaches may be employed as well (e.g., where the freed bandwidth can be aggregated or coalesced, sleep modes or other uses may be possible).

As used herein, the term "context information" includes, but is not limited to, data payloads useful for, inter alia, identifying information pertinent to one or more aspects of the wireless network or subscriber classes. Exemplary embodiments of context information are described in IEEE P1900.4 published on Feb. 27, 2009, and entitled "*IEEE Standard for Architectural Building Blocks Enabling Network-Device Distributed Decision Making for Optimized Radio Resource Usage in Heterogeneous Wireless Access Networks*", incorporated herein by reference in its entirety. The aforementioned publication describes context information including: CWN (Composite Wireless Network), Operator, Operator Profile, Operator Capabilities, Assigned Channel, Assigned Channel Profile, Regulatory Rule, SA Policy, RAN, RAN Profile, RAN Configuration, Base Station, Base Station Capabilities, Base Station Configuration, Base Station Measurements, Cell, Cell Profile, Cell Capabilities, Cell Configuration, Cell Measurements, etc.

It is appreciated that some types of context information change frequently, whereas other types of context information may change rarely, if at all. For example, context information regarding the occupation levels or constituency of a WLAN system may change quite frequently. Some network-specific context information (such as the Mobile Country Code (MCC)) for cellular networks changes infrequently, if at all. Thus, each segment of context information may have varying levels of importance, and/or frequencies of change. Accordingly, a CPC frame is disclosed herein which can dynamically vary the transmitted CPC context information segments to accommodate such differences. It is appreciated moreover that these levels of importance and/or change frequencies may themselves vary as a function of time or another parameter; e.g., a static code or piece of information may be temporarily elevated to high priority when being changed globally; such as when a network upgrade or revision is being implemented.

Furthermore, such user-context-dependent information may be based on both user and base station relationships. Such types of context information may be cell specific, and depend on the direction a UE is likely to move to. For instance, a UE may require knowledge that it is moving in a certain direction relative to the base station, that the UE is within a certain distance of the base station, or that the UE is located in a specific area (e.g., a hospital, university, enterprise campus), etc. Useful context information may include direction-dependent information, such as indications of nearby RATs, cells, channels, spectrum restrictions, positioning information (e.g. GPS, Galileo, and digital compasses), etc. For example, the user context-dependent segments of information broadcast in the current cell may comprise segments of information pertaining to the radio landscape of neighbor cells. In this directional embodiment, there may be segments for, inter alia, Northwest, North, Northeast, East, Southeast, South, Southwest, and West. A UE which is moving South of a base station may desire corresponding details about the radio landscape South of the base station, or its current position. Such directional context information is not needed for other UEs that are moving in other directions or remaining relatively stable, and may be ignored.

Similarly, radial distance (from the base station or another entity) may be used separately or in combination with direction, to provide user-context-dependent information. For example, a small cell which is completely subsumed by another cell (e.g., a femtocell operating within a macrocell) may provide radial context information to facilitate handover. Such radial context information is not decoded unless the UE is very close to the cell border.

The data contained within the context information might also be of a heterogeneous nature. For example, it was previously discussed that context information might be used to convey the availability or presence of differing RATs available to the UE. However, in addition to this presence information, additional information relevant to these differing RATs might also be provided. This additional information might provide served users with knowledge not only about the presence of the available RAT, but access information to facilitate the served user's ability to gain access to or optimize the operation of that particular RAT. Accordingly, the context information would be relevant to differing RATs that are available to the user.

Exemplary Cognitive Pilot Channel Base Station (CPC-BS) Apparatus—

Figure 5:
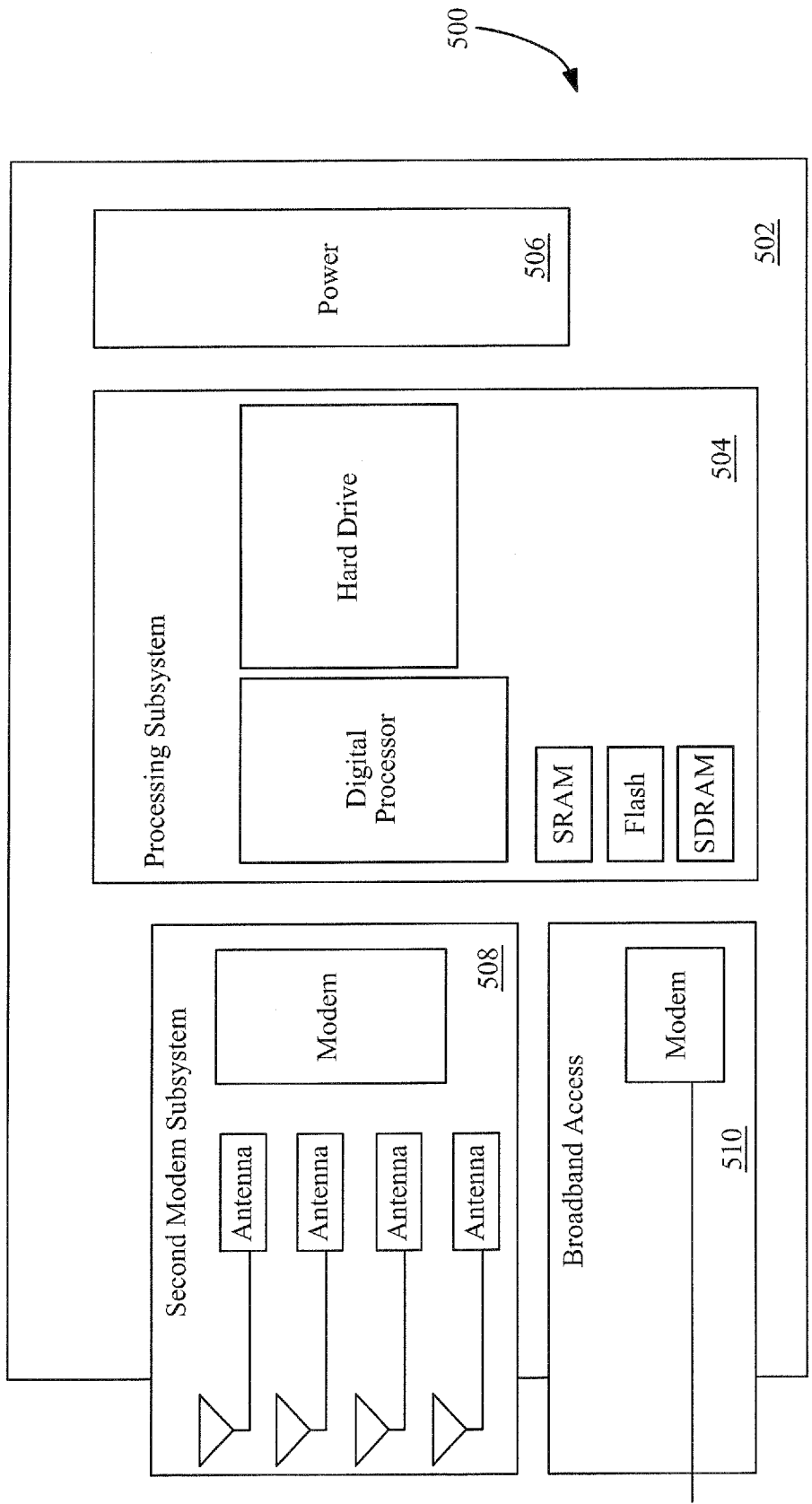
FIG. 5 is a functional block diagram illustrating one embodiment of a cognitive pilot channel base station apparatus according to the present invention.

Referring now to FIG. 5, one embodiment of serving base station apparatus 500 implementing various aspects of the present invention is illustrated. The base station apparatus 500 includes one or more substrate(s) 502 that further include a plurality of integrated circuits (ICs) including a processing subsystem 504 such as a digital signal processor (DSP), microprocessor, gate array, PLD, or plurality of processing components, as well as a power management subsystem 506 that provides power to the base station 500.

The embodiment of the apparatus 500 shown in FIG. 5 at a high level includes a modem circuit 508 configured to provide a segmented public broadcast of basic system information. The segmented public broadcast includes for example a time-varying broadcast of system information (SI), where segments of the system information are each selectively transmitted according to a corresponding priority. In alternate embodiments, the segments may be transmitted via secondary frequency bands, and/or code domains, etc. The modem subsystem includes one or more digital modems and a plurality of antenna radio.

The broadband access circuit 510 is configured to optionally provide access to the Core Network, and potentially other network entities (e.g. eNBs, HeNBs, etc.). The broadband access may comprise for example a simple DSL connection. In other embodiments, the broadband access may comprise, without limitation, a T1, ISDN, satellite link, WiMAX (802.16/801.16m, etc.) broadband wireless link, US "Smart Grid" initiative link, ETSI HiperMAN or a DOCSIS cable modem. In one variant, the broadband access only supports authenticated connections, thereby ensuring secure and authorized connections to the network infrastructure. In other variants, the broadband access can provide substantially unauthenticated access to other IP networks, thereby offering a wireless gateway to any connected internets, or the Internet (e.g., such as may be useful with WLAN embodiments of the invention).

The processing subsystem 504 may comprise a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 504 is preferably in data communication with one or more memory components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 5 includes various forms of volatile (e.g. SRAM, SDRAM, etc.) and non-volatile memory, such as a hard disk drive (HDD), and or Flash. An external Flash unit (e.g., Compact Flash 3.0) may also be used if desired. Additionally, the processing subsystem may also comprise a cache to facilitate processing operations.

The processing subsystem also additionally includes functional subsystems or modules for: (i) determining segments of basic system information, (ii) prioritizing the segments, and (iii) efficiently using spectral resources to distribute the various groups of segments to a population of UEs. These subsystems may be implemented in software, firmware and/or hardware, and are logically and/or physically coupled to the processing subsystem. Alternatively, in another variant, the subsystems or modules may be directly coupled to the transmitter of the subsystem.

In one embodiment, the segmentation subsystem (i) includes a database or memory structure localized within the apparatus 500 that is adapted to store one or more segments of the public broadcast information. Such segments may be derived at least in part from internal device operations, such as current UE occupancy, current time, current location, etc. In one variant, the segmentation subsystem may comprise a circular buffer or shift register. In alternate embodiments, the subsystem includes one or more interfaces to a centralized network controller, where the centralized network controller provides one or more of segments of the public broadcast information.

In yet another embodiment, the segments of public broadcast information may be related to properties which are queried or received from one or more external devices (e.g., nearby WLAN networks, etc.), In yet another embodiment, the segments of the public broadcast information may be set based on an environmental or location consideration, such as cells operating in the vicinity of a given location or entity (e.g., hospital).

The prioritizing subsystem (ii) of the apparatus may include for example monitoring apparatus for network activity, or memory apparatus adapted to store knowledge of the network activity. The input network parameters are provided to an optimization engine (e.g., algorithm implemented as a computer program executed by the processing subsystem) for dynamically assigning a priority to one or more segments of public broadcast information. It will be appreciated that the segmented public broadcast information may change on a regular or irregular basis; thus, the optimization engine may be run only in response to corresponding changes if desired. Furthermore, the prioritization subsystem may additionally include one or more interfaces adapted to exchange information with neighboring base stations or other network entities (e.g., inter-RAT compatible base stations, Wi-Fi Access Points, etc.).

The distribution subsystem (iii) of the apparatus 500 includes apparatus for broadcasting the various segments of the public broadcast information to the UEs. In one embodiment, the distribution subsystem is a time varying rotation of one or more segments of public broadcast information. In another embodiment, the distribution subsystem provides a time varying length of transmission. The distribution subsystem may also utilize multiple spreading codes (e.g., a CDMA based system), hopping sequences (FHSS), or alternately, other frequency bands (e.g., a, OFDM or FDMA based system), etc. In yet another embodiment, the distribution subsystem provides varying segmented public broadcasts based on one or more network parameters. In one implementation, the CPC frames are additionally configured to substantially minimize SDR UE power consumption, by providing variable length transmissions, suited for differing SDR UE requirements.

Methods—

Exemplary methods of operating the aforementioned base station (and UE) previously described herein according to the invention are now described in greater detail. In an exemplary embodiment of the invention, one or more segments of basic system information in a wireless (e.g., LTE cellular) radio system are transmitted, and received according to one or more desired reception criteria so as to minimize unnecessary use of spectral resources and/or receiver resources.

Example Operation—

Referring back to the exemplary heterogeneous network 400 of FIG. 4, three (3) distinct RATs are located within the same general vicinity; each RAT is actively provisioning independent service coverage. The heterogeneous network includes a first LTE eNB 402, a second LTE Home eNodeB (HeNB) 404, and a Wireless-LAN Access Point 408. Other RATs (not shown) may be used as well, such as for example one for WiMAX (IEEE Std. 802.16e-2005 entitled "IEEE Standard for Local and metropolitan area networks—Part 16:

Air Interface for Fixed and Mobile-Broadband Wireless Access Systems Amendment 2: Physical and Medium Access Control Layers for Combined Fixed and Mobile Operation in Licensed Bands and Corrigendum 1", which is incorporated herein by reference in its entirety). The first eNB and second HeNB are operating under the control of a single network operator. The WLAN AP is operating outside of the single network operator's control, and is privately administered by e.g., a home or business user. A first UE 410 is shown, operating within the coverage of all three networks.

Figure 6:
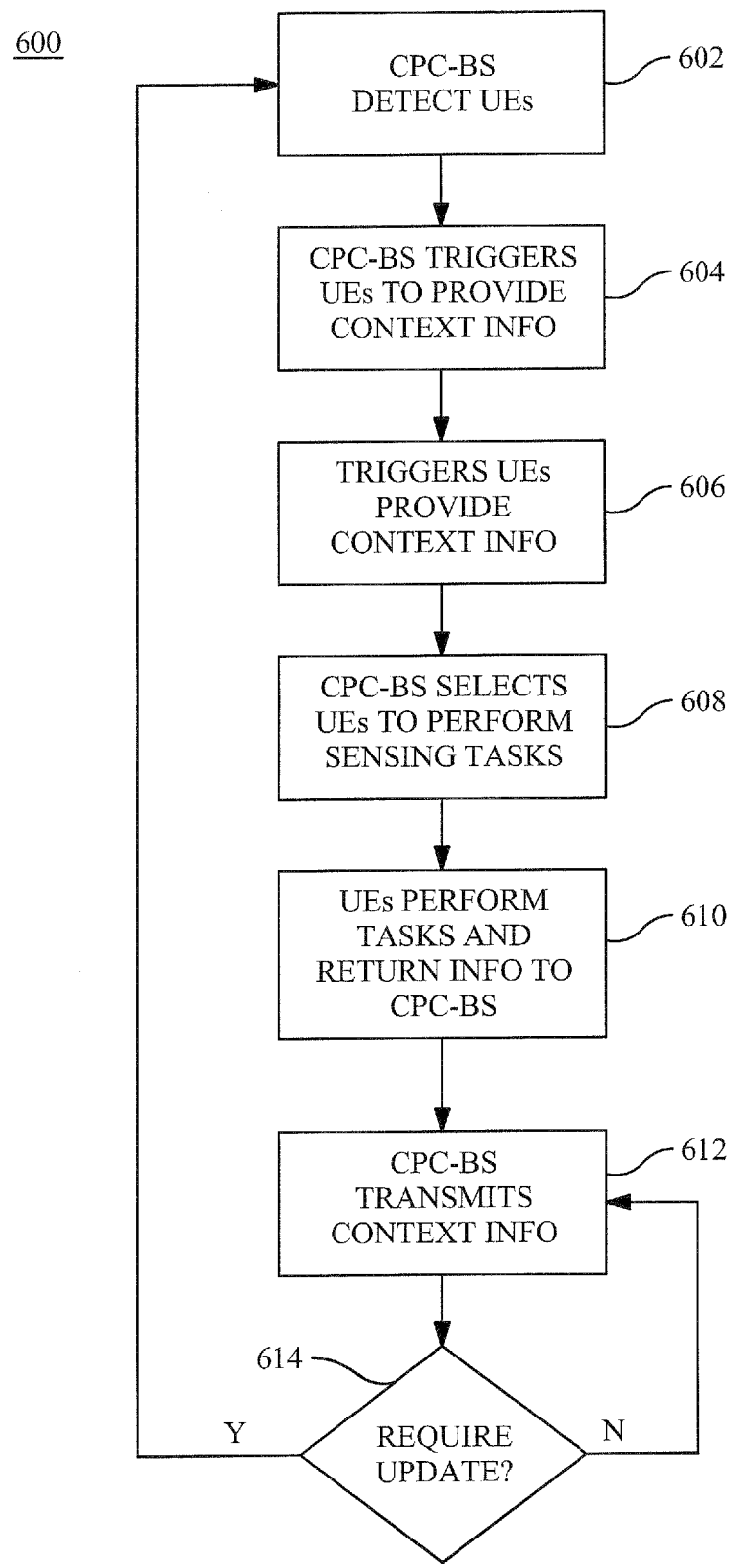
FIG. 6 is logical flow diagram of one embodiment of CPC-BS context information acquisition and transmission in accordance with the present invention.

Referring now to FIG. 6, exemplary methodology 600 for context information acquisition, assignment of sensing tasks, and broadcast of available context information using a CPC-BS in a network (such as that shown in FIG. 4), is shown and described in detail. Specifically, the exemplary methodology of FIG. 6 is particularly useful in situations in which the CPC-BS has specific knowledge about served users (i.e., identification information of target UEs). By having specific knowledge about served users, the CPC-BS is subsequently able to actively recover context information available in the various UE devices. This context information may contain information related to ongoing communication links such as, Packet Error Rate (PER), link quality, quality of service (QoS), jitter/packet loss rate or fraction, and various other performance measurements useful in the operation of the network. At step 602, the CPC-BS detects the presence of known UEs on the network with which it can communicate. By detecting the presence of these known UEs, the CPC-BS can better make use of the network resources available to it when acquiring context information.

At step 604, the CPC-BS triggers the UEs to provide context information to the CPC-BS. In one embodiment, such an acquisition of context information can be performed by triggering the various UEs with information contained in the CPC information broadcasted by the CPC-BS. Alternatively, the trigger may be provided within any data channel available to the target UEs such as, for example, by using an IP link between the CPC-BS and the various UEs. While the triggering function of step 604 is primarily contemplated in the context of the CPC-BS generating the trigger function, it is recognized that alternative implementations could obviate the trigger functionality of the CPC-BS, rather leaving the trigger to other entities within the RAN. For example, in one embodiment, the trigger could execute on a periodic basis, without necessitating the transmission of a trigger (i.e., the trigger could be generated randomly or occur on a schedule internal to the respective UE). Furthermore, in one such embodiment, parts of the electromagnetic spectrum could be scanned periodically such that, e.g. a UE first scans the lower part of the spectrum, pauses, and then subsequently scans at a higher part of the spectrum. Alternatively, the trigger could originate from a "proxy" (e.g., a cellular BS).

At step 606, the triggered UEs transmit their context information to the CPC-BS. Alternatively, if that context information is not available, the UEs provide notification to the CPC-BS of the unavailability of the requested context information.

At step 608, the CPC-BS selects one or more UEs to perform specific tasks. Herein lies a salient advantage of the invention over prior art solutions, in that the dedicated CPC-BS is able to distribute tasks among the various UEs located on the network. This is particularly useful in situations in which UEs are used to sense diverse, heterogeneous communication environments, while avoiding the need that each UE scan the whole band (e.g. 470 MHz to 5 GHz) for all types of systems. Accordingly, the sensing task is split among a multitude of UEs. For example, in an exemplary implementation, sensing tasks (e.g., sense available WLAN APs in the 2.4 GHz band, etc.) could be distributed among a set of neighboring UEs in order to minimize the overall output power spent by the various UEs. The CPC-BS could for instance distribute sensing tasks such that one user (or a small sub-group of users) may be asked to sense parameters associated with WLANs in the 2.4 GHz band, while another user (or small sub-group of users) may be asked to sense cellular system parameters in the 900 MHz band. In addition to, or as an alternative to sensing parameter associated with WLANs, UEs could be tasked with scanning for the presence of a variety of wireless systems such as those previously discussed herein. Additional sensing tasks may include QoS (Quality of Service) estimates such as Packet Error Rate, Link loss probability, Interference levels, etc.

In embodiments in which the coverage area contains a relatively large number of users, the sensing tasks may be cyclically attributed to user sub-groups whose participants change from one scanning event to the next scanning event. Such a scanning approach may then be organized such that a specific UE is asked as rarely as possible to actually scan a certain band, further reducing the overall scanning time, minimizing the processing burden to individual UEs while guaranteeing the availability of the information. Contrast the approach discussed above with implementations in which each UE is performing the entire set of sensing tasks alone. This latter approach can be expensive in terms of, inter alia, power consumption and sensing time, items which are at a premium in today's UE devices.

At step 610, the various UE perform their assigned tasks, and the sensed or collected information (or a processed portion or derivation based thereon) is subsequently forwarded to the CPC-BS. The CPC-BS then collects and compiles all the "sensed" information along with other available context information, and generates a suitable information block for storage within the CPC-BS itself.

At step 612, the CPC-BS transmits information contained within this information block on towards one or a group of users within the coverage area of the CPC-BS. In one embodiment, this broadcast is cyclically repeated such that new users entering the coverage area of the CPC-BS can also readily access this information. The CPC frame containing the context information provided will also, in certain implementations, make use of a so-called "toggling" preamble. This toggling preamble is particularly useful in situations where broadcasted information is cyclically repeated to served users who have already decoded the context information present within the cyclically repeated CPC frames. In this manner, an existing user within the coverage area who has already decoded the transmitted CPC frames need only look to the preamble to determine whether or not the entire CPC frame needs to be decoded. By first examining the preamble prior to decoding the CPC frame, existing users need not waste processing resources on their UE to decode the incoming CPC frame that merely contains redundant context information. The preamble of the CPC frame will "toggle" (i.e., change) whenever new context information becomes available to the coverage area. At that point, the existing UEs would now know to decode the incoming CPC frame for the newly provided context information.

At step 614, the CPC-BS evaluates whether context information requires an update, and either continues to cyclically transmit context information to its coverage area at step 612, or otherwise restarts the process methodology of FIG. 6 at step 602.

Figure 7:
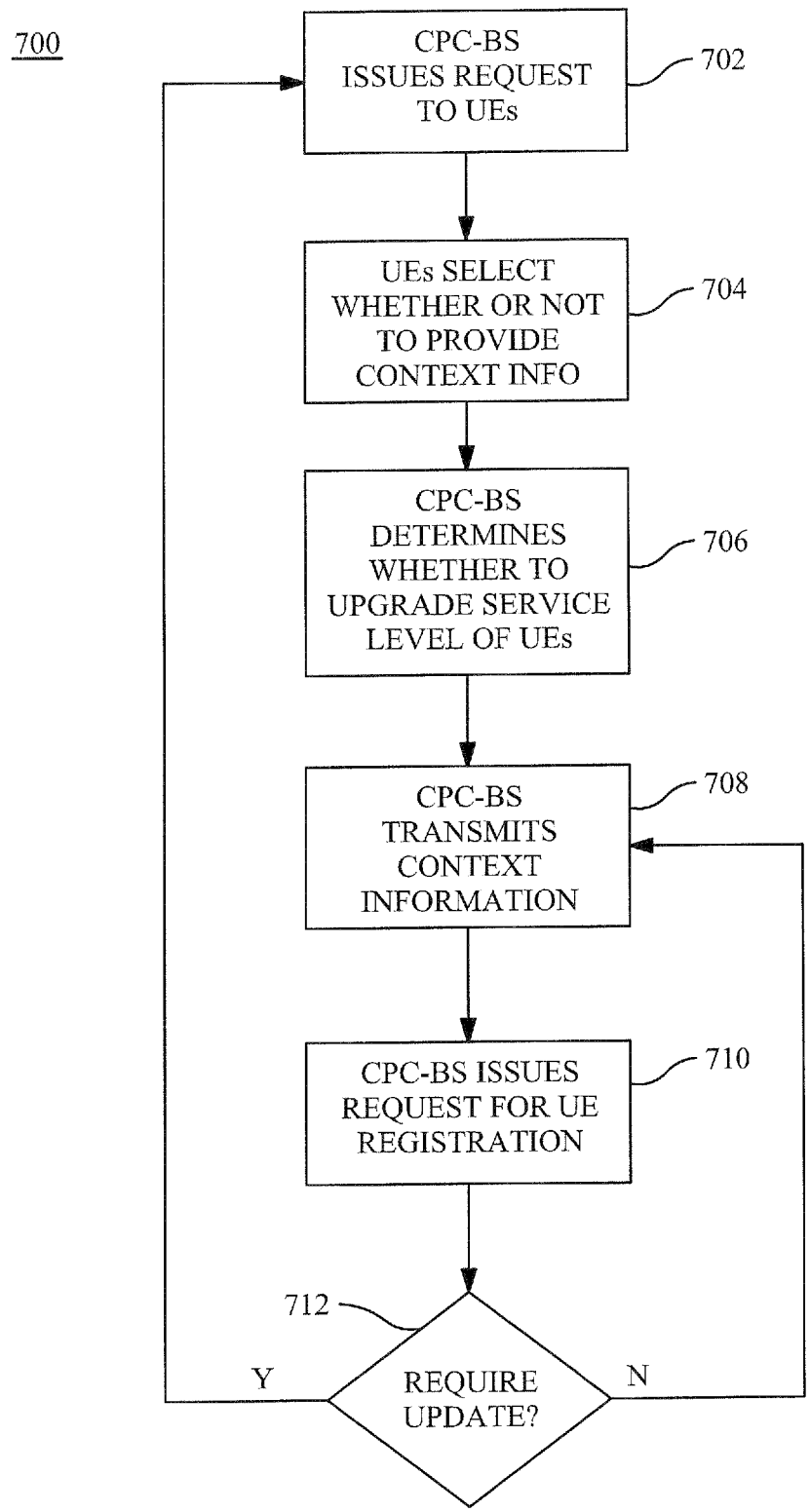
FIG. 7 is a logical flow diagram of a second embodiment of CPC-BS context information acquisition and transmission in accordance with the present invention.

Referring now to FIG. 7, exemplary methodology 700 similar to that described with regards to FIG. 6 above is disclosed, yet under conditions in which specific knowledge about all UEs within the CPC-BS coverage area is not required. More specifically, the methodology of FIG. 7 is useful in situations in which the CPC-BS has partial knowledge about served users. Partial knowledge includes, without limitation: (1) partial knowledge about the UE hardware configuration capabilities of each targeted UE (i.e. can the UE scan the whole band of interest? Can the UE scan 3GPP systems? Can it scan IEEE 802.11x systems? Can the UE scan IEEE 802.16 systems? Can the UE scan for systems and operate communication links simultaneously? etc.); (2) exact knowledge for a subset of users and zero or partial knowledge on the hardware configuration capabilities of another subset of users; and (3) partial knowledge in the sense that the network does not (exactly) know how much time a specific UE can spend for scanning due to ongoing data exchange, etc. While it is desirable for the CPC-BS to have specific knowledge about the UEs/MDs exploiting its services, it is appreciated that it often may be difficult for a variety of technical reasons for the CPC-BS to automatically detect and monitor the capabilities of all UEs which are effectively using the CPC broadcast service the CPC-BS is offering.

At step 702, the CPC-BS issues a call for context information to all users (whether known or unknown to the CPC-BS) by way of a broadcast transmission. In one exemplary embodiment, the CPC-BS may include this call for context information within the CPC frame.

At step 704, the various UEs which receive this call (e.g. context information call within the CPC frame) may then choose whether or not to provide the requested context information via a communication link (e.g. via an IP link with the CPC-BS). If one or more UEs deliver the context information requested by the CPC-BS, the CPC-BS then merges the received information into its information database. In an exemplary embodiment, the merged information is selected so as to provide a common result (i.e., by eliminating contradictory information elements, etc.).

At step 706, the CPC-BS determines whether or not to upgrade the "service level" for individual ones of those UEs which have provided the requested context information.

This determination by the CPC-BS provides incentive for the UEs which are delivering the information by allowing them to join a preferred users group that contains, for example, more detailed context information in their area of interest. One exemplary incentive encourages UEs to "register" their presence to the CPC-BS. Such an implementation is deployed in one variant by broadcasting a portion of the CPC broadcast frame such that it is not encrypted, thereby making it accessible by anyone capable of receiving the CPC frame. However, a second portion of the CPC broadcast frame is encrypted, with a key being required in order to read (decrypt) the context information. Other non-encryption based privacy schemes may be used as well.

Furthermore, various secondary encrypted or protected fields may also be optionally included, each field or subgroups of fields requiring e.g., a unique key. Such an implementation can thus be exploited in order to generate different types or levels of services, such as e.g., a "gold", "silver", and "bronze" level of service. The varying levels of service include context information that is more or less detailed or enriched, more or less recent, more or less often transmitted, more or less reliable, etc.

Yet an additional variant of the aforementioned graduated level of service scheme involves the upgrade of the service type assigned to a user (e.g. for a limited time) if it provides the context information in alignment to a "context call" issued by the CPC-BS. Accordingly, such an approach that includes an aspect of time dependency would permit embodiments in which the encryption keys for the varying levels of service can be cyclically changed or rotated. Based on the determinations made in step 706, the CPC-BS transmits the various encryption keys (such as triple DES (3DES), etc.) to users in the CPC-BS coverage area.

At step 708, the CPC-BS collects and updates the available context information that it has received from UEs, or has otherwise obtained from various network resources. This latter case might include, for example, various measurements performed by the CPC-BS itself, by a third party, or via various measurement units deployed by a CPC-BS or network operator.

At step 710, the CPC-BS optionally issues a request for UE registration. As discussed previously, in an exemplary embodiment, UE registration could be incentivized by offering an upgraded level of service for a period of time (whether of limited duration or in perpetuity), thereby facilitating the ability for the CPC-BS to more efficiently distribute tasks and/or context information to various UE within the CPC-BS coverage area.

At step 712, the CPC-BS evaluates whether context information requires an update, and either continues to cyclically transmit context information to its coverage area at step 408, or otherwise restarts the process methodology of FIG. 7 at step 702.

Figure 8:
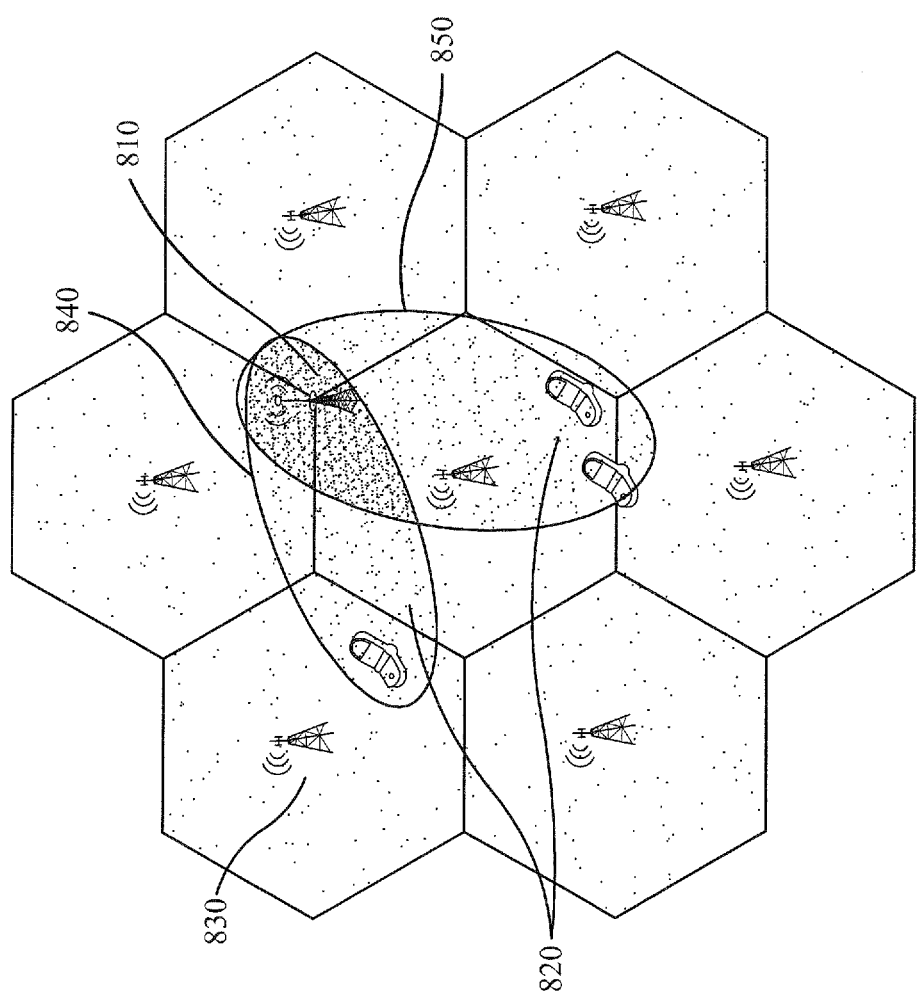
FIG. 8 is a graphical representation of exemplary heterogeneous RAN, illustrating one embodiment of a directed CPC transmission, in accordance with the present invention.

In addition, because of the information available to the CPC-BS using the methodologies discussed previously with respect to FIG. 6 and/or FIG. 7, the transmission of data including context information to UE within a given coverage area can be optimized so as to provide increased efficiency, as well as enhanced signal reception relative to background noise or other sources of electromagnetic interference. For example, referring to FIG. 8, a CPC-BS 810 according to one variant of the invention can be configured such that coverage is optimized for addressing target UEs 820 in the presence of other macro-cell base stations 830. In one embodiment, the coverage optimization is accomplished by utilizing suitable beam-forming techniques so as to produce, inter alia, beamformed CPC transmissions 840, 850. Such an implementation is made possible due to knowledge at the CPC-BS regarding various users in its coverage area. For example, if the CPC-BS has specific knowledge about various users of its CPC context information (including their respective geographic positions), the CPC contact information can be directed to the users employing beam-forming or other techniques such as antenna selection, output power selection, and the like, so as to tailor its emissions to only a prescribed geographic subset. Antenna selection allows for variation of radiated signal as a function of azimuth angle, while power is generally related to range. Hence, the CPC-BS can "address" a given polar coordinate slice relative to itself based on selection of one or both of these parameters.

Figure 9:
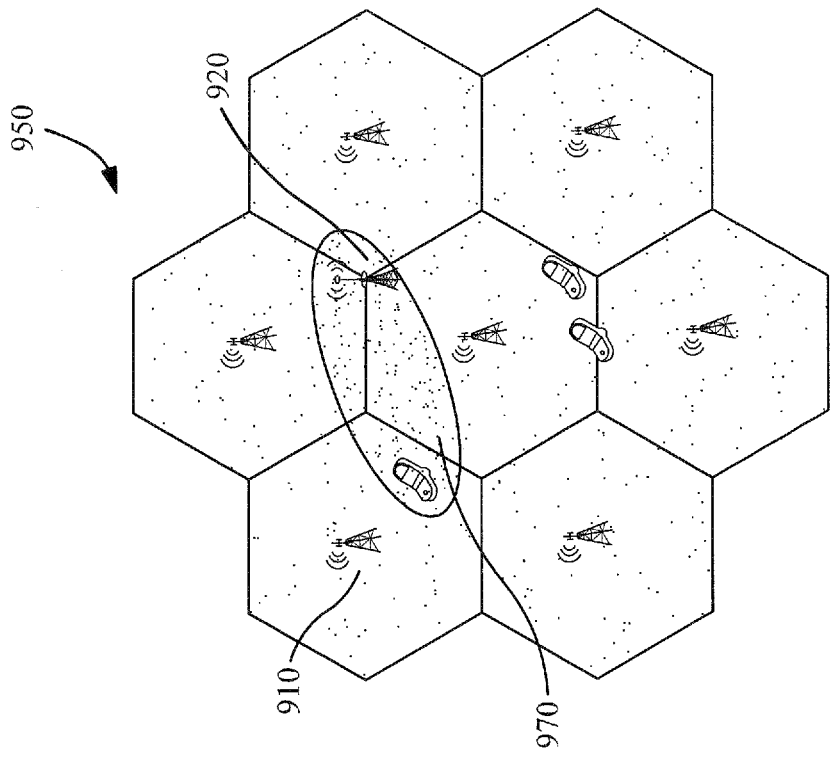
FIG. 9 is a graphical representation of an exemplary heterogeneous RAN illustrating one embodiment of a modified beamforming CPC transmission in accordance with the present invention.
Figure 9:
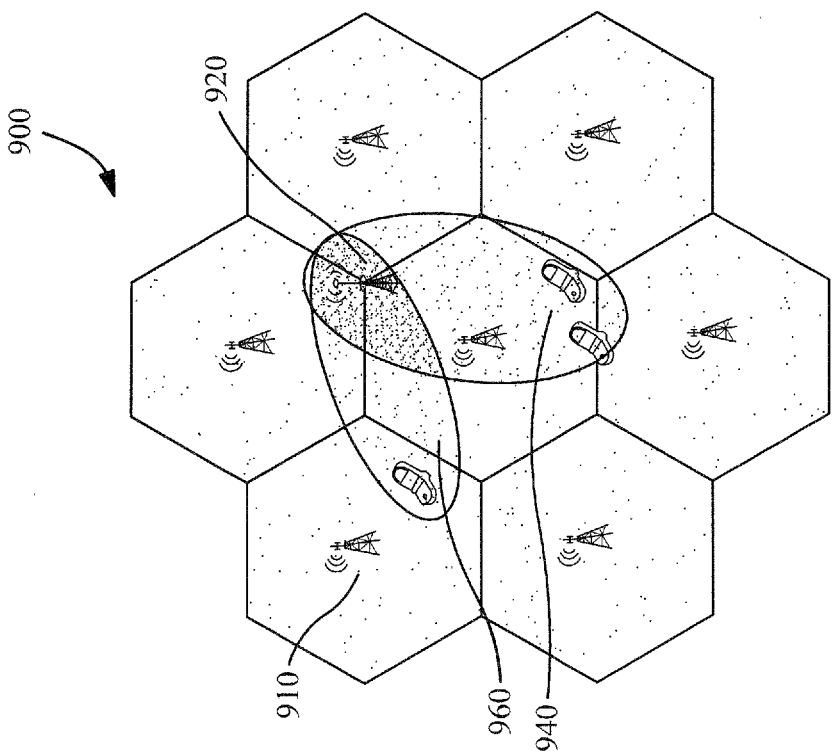

Referring now to FIG. 9, an exemplary embodiment illustrating modified beamforming within a single CPC frame is shown and described in detail. Within any given CPC frame transmitted in a CPC-BS 920 coverage area, a typical UE is only interested in a portion of that CPC frame transmitted. Accordingly, the CPC-BS can take advantage of knowledge it possesses about its coverage area to provide each CPC frame transmitted in, for example, the most energy efficient manner possible. For example, in the embodiment illustrated in FIG. 9, a first part of the CPC frame is transmitted to all users within a coverage area at 940, 960, whether as an omni-directional broadcast, etc., or as one or more beamformed CPC transmissions. At a subsequent portion of the transmitted CPC frame at 950, the CPC-BS can then address a limited subset of user's 970 within the CPC-BS coverage area, such as a user serviced by eNB 910.

On-Demand CPC Provisioning—

Figure 10:
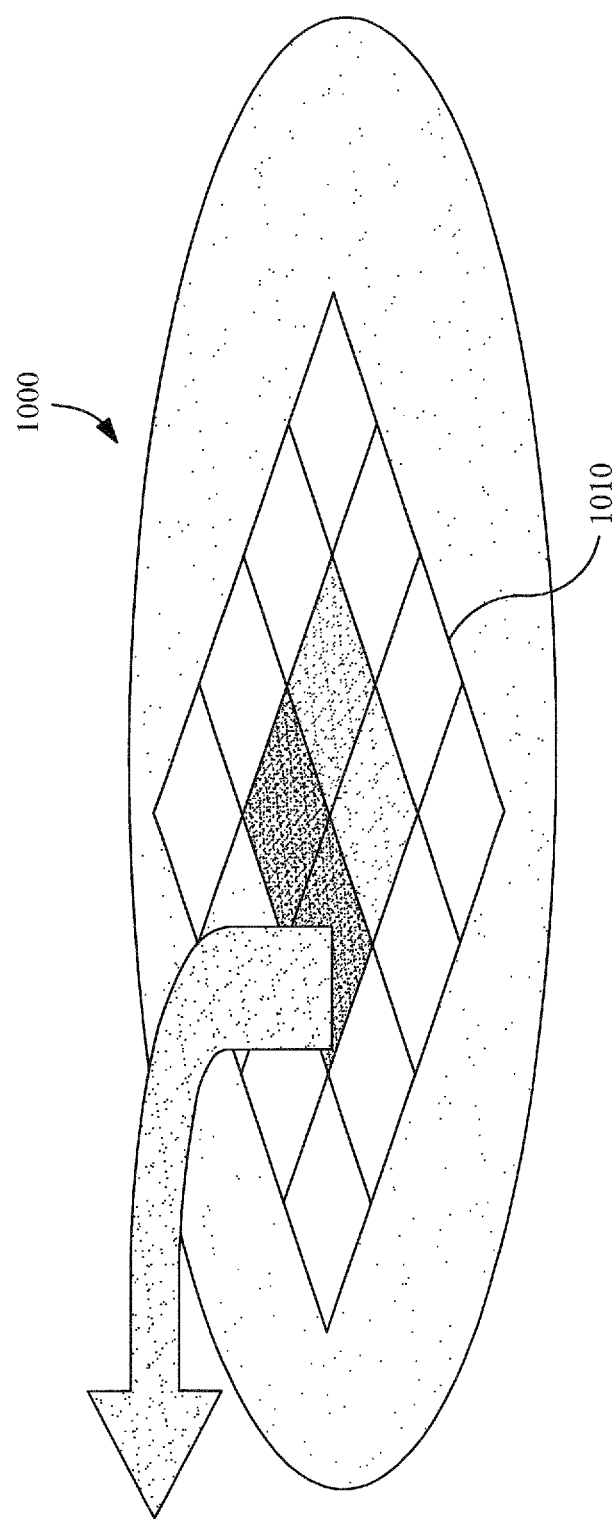
FIG. 10 is a graphical representation of an exemplary mesh approach to providing CPC enabling dynamic spectrum allocation in accordance with the present invention.

FIG. 10 illustrates a concept proposed for fourth generation wireless networks, in which geographical areas 1000 are divided up into a set of individual "meshes" 1010. This mesh approach is described in, inter alia, *A Novel On-Demand Cognitive Pilot Channel Enabling Dynamic Spectrum Allocation*; Perez-Romero, J.; Salient, O.; Agusti, R.; Giupponi, L., New Frontiers in Dynamic Spectrum Access Networks, 2007. DySPAN 2007. 2nd IEEE International Symposium on Apr. 17-20, 2007, pages: 46-54, which is incorporated herein by reference in its entirety. Further discussion of this mesh approach is also described in *Development of a Radio Enabler for Reconfiguration Management within the IEEE P1900.4 Working Group*, Holland, O.; Muck, M.; Martigne, P.; Bourse, D.; Cordier, P.; Ben Jemaa, S.; Houze, P.; Grandblaise, D.; Klock, C.; Renk, T.; Jianming Pan; Slanina, P.; Mobner, K.; Giupponi, L.; Romero, J. P.; Agusti, R.; Attar, A.; Aghvami, A. H.; New Frontiers in Dynamic Spectrum Access Networks, 2007. DySPAN 2007. 2nd IEEE International Symposium on Apr. 17-20, 2007, Page(s):232-239, also incorporated herein by reference in its entirety. However, each of the aforementioned publications only address the case in which a UE is requesting CPC information, and this information is then provided only on either: (1) a per-UE (i.e. peer-to-peer) basis; or (2) made available to all users via broadcast. These two approaches are clearly not optimized for every use case.

Figure 11A:
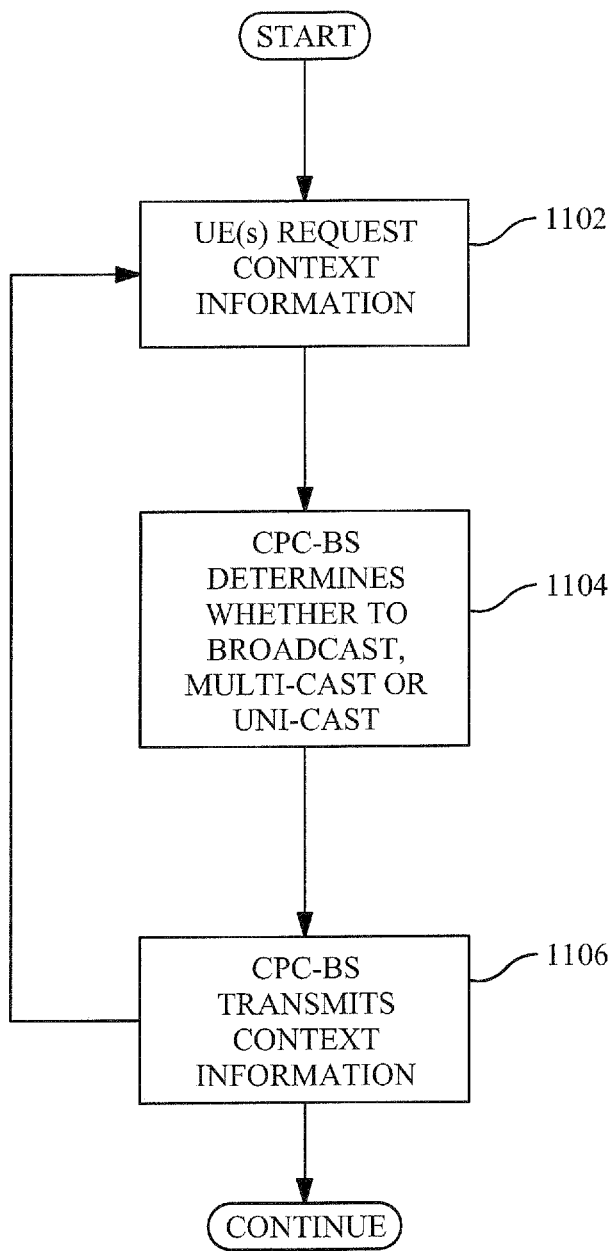
FIG. 11A is a logical flow diagram of a first embodiment for CPC-BS broadcast and peer-to-peer communication on-demand in accordance with the present invention.

Referring now to FIG. 11A, exemplary methodology 1100 for providing on-demand CPC-BS broadcast and peer-to-peer communication is shown and described in detail. At step 1102, one or more UE(s) request context information from a CPC-BS.

At step 1104, the CPC-BS determines whether to broadcast, multi-cast or unicast the transmission of context information. In one embodiment, this decision is made for each context information element to be transmitted. Such a decision is made whether the given context information element should be transmitted peer-to-peer (i.e. multi-cast, from one peer to a plurality of peers, or unicast), or whether it should be broadcast to all users. For example, in situations where individual users don't need to be registered in order to obtain context information, it may be the most desirable to broadcast the context information. However, if only registered users are eligible to receive the context information, it may be more suitable to multi-cast the context information. In instances where the context information may be sensitive (i.e. confidential) or where the context information is required by only a single user, a unicast/peer-to-peer (P2P) approach might be the most suitable. Additionally, if the CPC context information can be compiled for a geographically grouped subset of users, a broadcast in combination with beamforming techniques might be the most suitable approach for having the signal present only at the location of the grouped subset of concerned users. Furthermore, using this approach other subsets of users present at different locations can thus be served in parallel with other CPC context information using suitable beamforming techniques. Due to the different beamforming, mutual information amongst the transmitted context information is avoided. The determination made at step 1104 can also take into account the level of service afforded individual users (e.g., the "gold", "silver" levels of services discussed previously). Once the decision to broadcast, multi-cast or unicast has been made, all relevant information to be transmitted is grouped or otherwise merged into a common set of contextual information elements.

At step 1106, the common set of contextual information elements are transmitted via the CPC-BS. This transmission occurs via a CPC broadcast, multi-cast or unicast depending on the decision that was made at step 1104. In this fashion, CPC-BS contextual information can be provided to all users in a coverage area or individual mesh or to a subset of users (including a single user) within that coverage area.

Figure 11B:
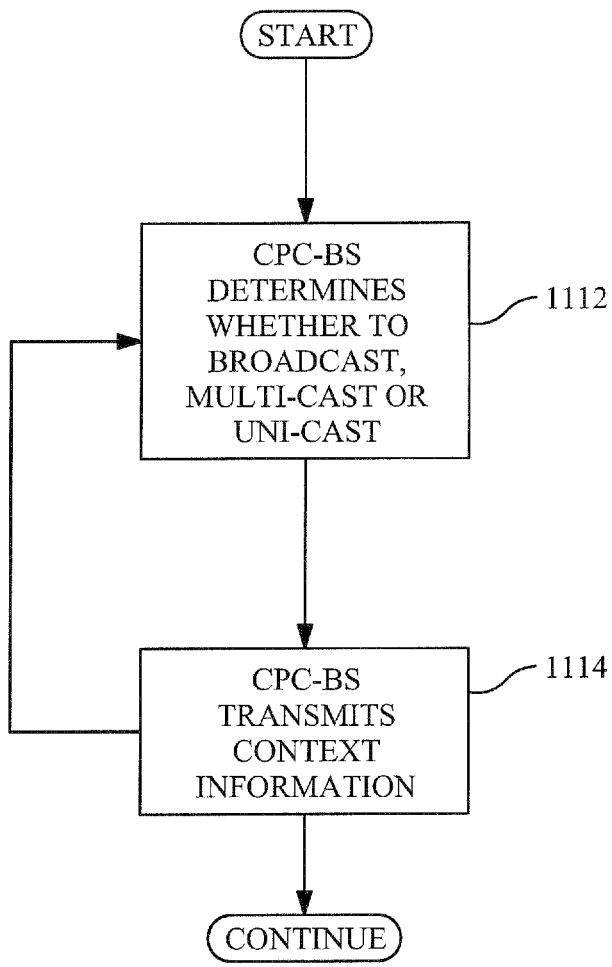
FIG. 11B is a logical flow diagram of a second embodiment for CPC-BS broadcast and peer-to-peer communication on-demand in accordance with the present invention.

Referring now to FIG. 11B, exemplary methodology 1110 for providing on-demand CPC-BS broadcast and peer-to-peer communication is shown and described in detail in which the UE(s) no longer need to make requests for context information. In this context, the term "on-demand" means that a party initiated the necessity or desirability to transmit context information (e.g. a wireless access point becomes available to the network); however the party receiving the context information (e.g. a UE) didn't need to make a request in order to receive this context information. Rather, the CPC-BS will instead periodically transmit context information unsolicited from the receivers of the context information. The periodicity of these transmissions can, in one embodiment, be time-based (i.e. periodically transmitted solely based on time considerations without necessitating a UE(s) request). Alternatively, the periodicity of these transmissions can be, in an alternative embodiment, based on the amount of context information available to send. For example, the CPC-BS can transmit context information immediately whenever context information becomes available or alternatively, wait until a threshold level of context information becomes available for transmission.

At step 1112, the CPC-BS determines whether to broadcast, multi-cast or unicast the transmission of available context information, similar to step 1104 described previously herein. In addition, this determination is, in some instances, affected by the periodicity of the context information transmission. For example, certain broadcast context information transmissions might benefit from basing periodicity on a threshold amount of context information to send, while a unicast transmission might occur as soon as the context information becomes available. Alternatively, the determination is simply made based on a timer (i.e. the timer expires and the determination is made similar to that discussed above with respect to step 1104, FIG. 11A).

At step 1114, the common set of contextual information elements are transmitted via the CPC-BS. This transmission occurs via a CPC broadcast, multi-cast or unicast depending on the decision that was made at step 1112. In this fashion, CPC-BS contextual information can be provided to all users in a coverage area or individual mesh or to a subset of users (including a single user) within that coverage area.

Figure 12:
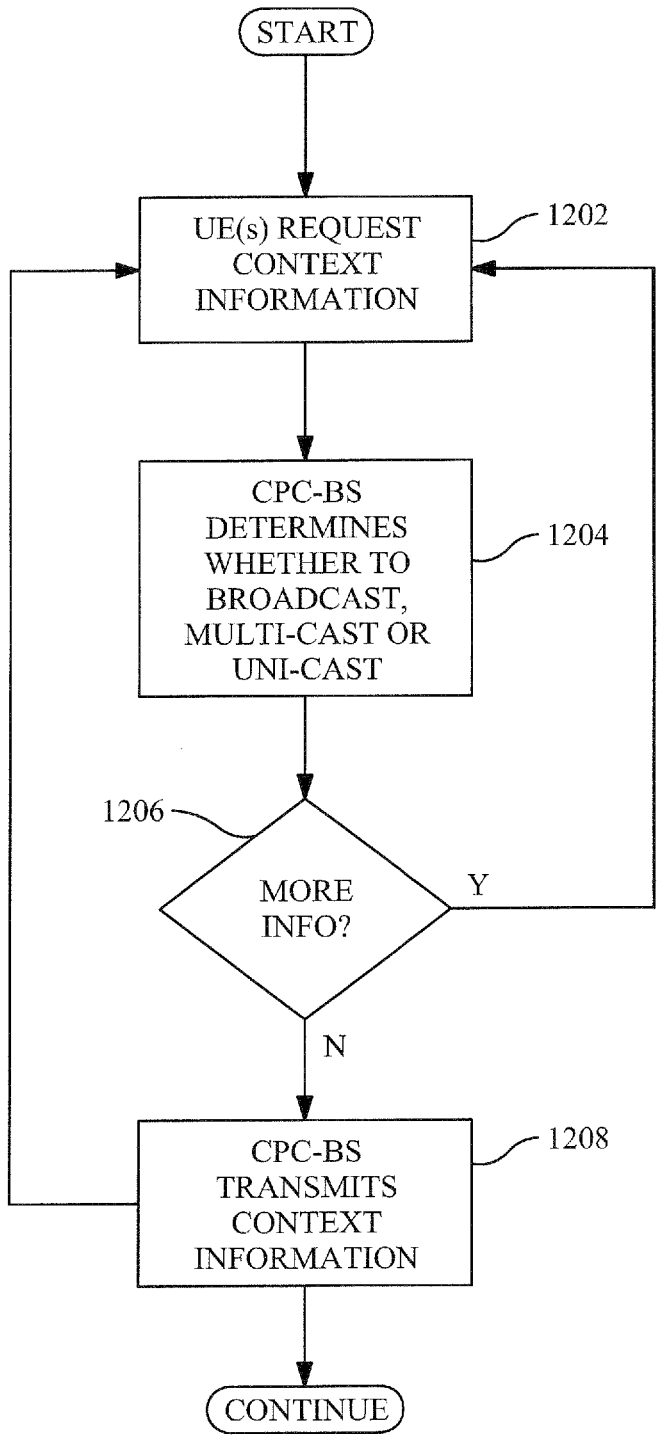
FIG. 12 is a logical flow diagram of a third embodiment for CPC-BS broadcast and peer-to-peer communication on-demand in accordance with the present invention.

Referring now to FIG. 12, a variation on the provisioning of on-demand CPC-BS broadcast and peer-to-peer communication illustrated and described with respect to FIGS. 11A and 11B is shown and described in detail. Specifically, the methodology 1200 of FIG. 12 introduces a waiting period in order to, inter alia, provide for more efficient utilization of available bandwidth when transmitting contextual information.

At step 1202, one or more UE(s) request contextual information from the CPC-BS.

At step 1204, the CPC-BS receives the request for contextual information, and decides whether it needs to broadcast, multi-cast or unicast the requested information. In an exemplary embodiment, the CPC-BS decides for each context information element whether it needs to be communicated on a peer-to-peer basis to the concerned user(s), or whether it can be broadcast to all users using similar methodology as described above with respect to step 1104 (FIG. 11). For example, the decision can be made based on the service contract established for each user(s), i.e. whether they are allowed to receive and/or decode "gold", "silver" services, etc. All the context information to be transmitted is subsequently grouped and/or merged into a common set of contextual information elements.

At step 1206, the CPC-BS determines whether or not more contextual information is to be requested prior to transmission. In other words, the CPC-BS does not react immediately to each context provision request with the transmission of the CPC data. Rather, the CPC-BS bundles incoming requests for a period of time (or until a certain event occurs), and then transmits the required information in a compacted way to the requesting UE(s). This is useful, for example, where multiple closely neighbored UEs are requesting context information over a period of time, such that a single CPC-BS transmission would be enough to satisfy their requests.

In one variant, the latency or delay period is predetermined. In another variant, the period is based on the number of requests received per unit time (e.g., a higher number of UE requests in a given time period will cause the CPC-BS to adaptively shorten the delay. In yet another variant, the delay is determined based at least in part on a statistical analysis of the received requests over a given time period. For instance, in the hypothetical case where N requests were all received contemporaneously within a t-second interval, there would be a complete correlation between the requests, indicating that a greater delay can be tolerated (since there will be no requests which age more than others). Conversely, where all the requests were received at either the very beginning or very end of the t-second interval, the correlation would be poor (i.e., a UE request received at the first part of the interval would experience a delay of approximately t seconds as compared to one received at the end of the interval). Hence, a metric of this distribution (e.g., s or variance) may be used in determining an appropriate delay.

At step 1208, the CPC-BS transmits the context information via a CPC-BS broadcast and/or a peer-to-peer communication depending on the decision previously made at step 1204. Accordingly, UEs that have sent out similar or identical CPC requests for contextual information, or otherwise have other commonalities such as residing in the same prescribed geographic location, are then grouped (based on context) by the CPC-BS for the subsequent transmission of grouped context information. Therefore depending on, for example, the number of regrouped users, the "granularity" of the provided coverage information is dynamically adapted. For example, where a relatively small number of users are regrouped, contextual information that includes only locally available radio access technologies (RATs) (Radio Access Technologies) are included. These locally available RATs could include wireless protocols such as Bluetooth, ZigBee™, among others. If however a larger number of users are regrouped, then the short-range RATs context information is only provided if there is sufficient capacity left in the CPC channel. In this fashion, context information that is applicable to the largest group of users will be given highest priority, with subsequent context information being provided if there is excess capacity. Similarly, context information for wide area systems can be prioritized with shorter range systems being provided if there is excess capacity.

Figure 13:
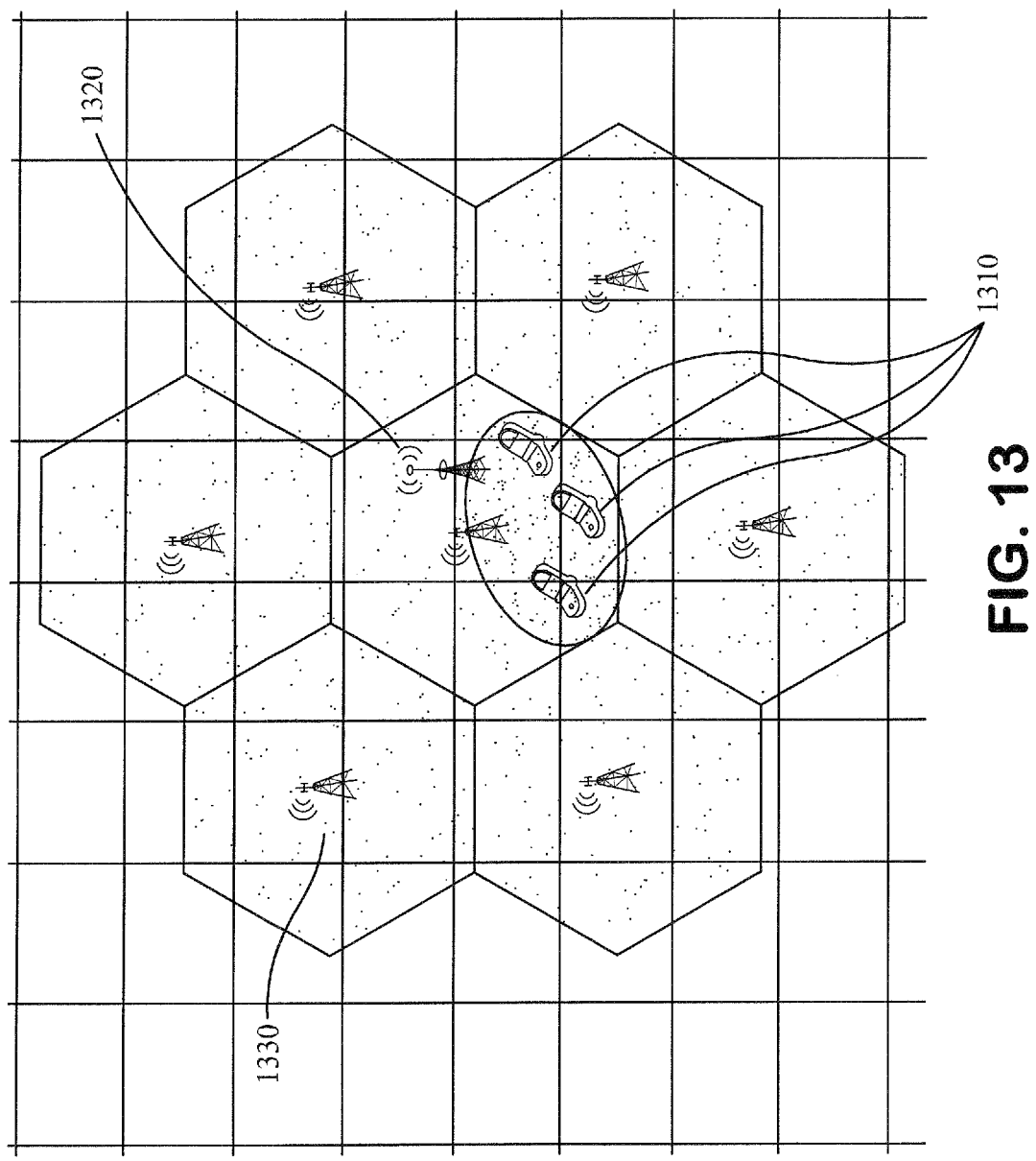
FIG. 13 is a graphical representation of one exemplary regrouping variant of CPC information for various meshes using the mesh approach illustrated in FIG. 7 herein.
Figure 14:
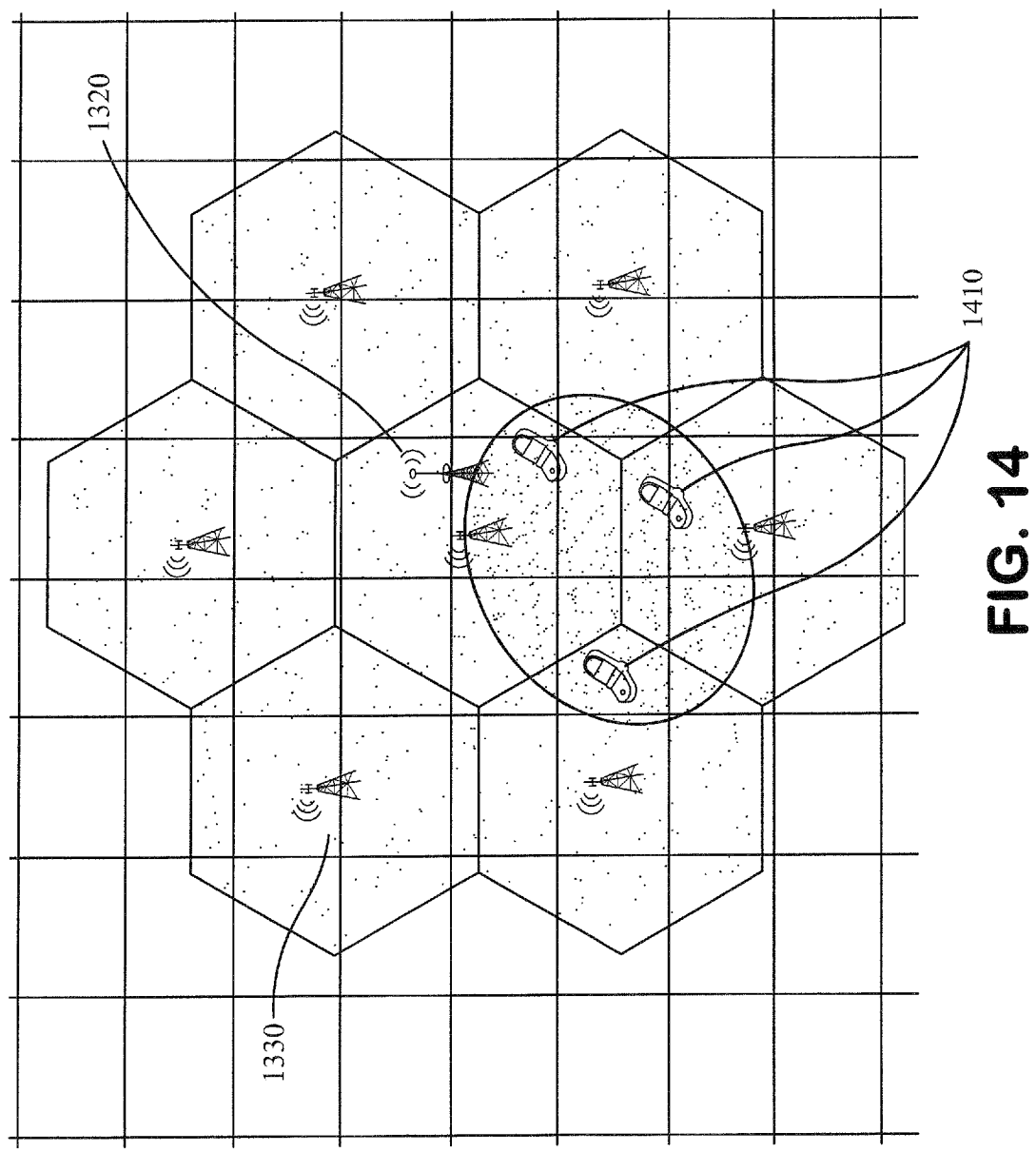
FIG. 14 is a graphical representation of a second exemplary regrouping variant of CPC information for various meshes using the mesh approach illustrated in FIG. 7 herein.

FIGS. 13 and 14 illustrate two (2) exemplary operational examples for the above-mentioned methodologies which focus on varying levels of coverage information "granularity". In some situations, it can be expected that various UEs will send out identical or otherwise similar CPC requests, such as for example with reference to the same geographic location or some other shared commonality such as hardware configuration capabilities (e.g. a similar UE type such as an iPad, iPhone, voice only phone, etc.). These UE can then be grouped together by a serving CPC-BS.

For example, FIG. 13 shows an example in which three (3) UEs 1310 reside in relatively close proximity to one another within a cellular architecture having a plurality of macro-cell BSs 1330. These UEs are all requesting context information from the CPC-BS 1320. As a result of their relatively close geographic proximity to one another, the CPC-BS 1320 can use this knowledge when serving these UEs. Thus, the context information provided by the CPC-BS 1320 only needs to cover a relatively limited geographic area. Accordingly, relatively fine-grained information can be provided for this coverage area without requiring too much transmission bandwidth for the CPC, as there are presumed commonalities among the UEs being served. Thus the CPC-BS may, as an example, provide coverage information for locally available Radio Access Technologies (RATs) that might otherwise become too burdensome or consume too much bandwidth for a grouping with wider geographic dispersion of UE apparatus. For instance, the CPC-BS could provide information about Bluetooth™ piconets, or other low-range wireless protocols such as ZigBee, etc. However, if the number of users within the CPC-BS grouping exceeds a given threshold, then fine granularity information, such as for short-range communications protocols will only be provided or prioritized if there is capacity left within the CPC channel.

FIG. 14 illustrates three (3) UEs 1410 that require context information over a larger geographical area, as compared with the example discussed above with regards to FIG. 13. As each of these UEs no longer reside in geographic locations where there is a commonality amongst the RATs available to each of the devices, the transmission of all available RATs to these devices may consume a large amount of bandwidth, potentially overwhelming the CPC channel. Accordingly, the transmission of all available systems may require the independent communication of these available short range RATs to each of the UEs in the grouping illustrated in FIG. 14.

Dealing with the problem presented in FIG. 14 can be handled in any number of different manners. One such method for handling larger geographical dispersion of the devices is to limit the amount of short range contextual information that is transmitted, in order to save CPC transmission bandwidth. This could be handled for instance by discriminating based on a user's class or subscription status (e.g. "gold", "silver", etc.) as was discussed previously herein. For example, finer granularity contextual information (such as information regarding short range RATs) might only be provided to "gold" level members once the CPC bandwidth became sufficiently congested. As yet another example, the type of contextual information may be prioritized so that lower priority contextual information (e.g. short range RAT information) would be obviated in favor of higher priority contextual information, again based on e.g., available CPC bandwidth. Furthermore, the priority scheme utilized could be dynamic in nature, as the priorities for types of contextual information could be user- and/or situation-dependent. For instance, one user of a UE might prioritize the type of contextual information they receive differently then another user. In this manner, the content within the contextual information delivered via the CPC would change on a dynamic basis based on the needs of the UEs that it is serving. This dynamic variation may also be based on a user's operational scenario; for example, a given user might specify a given preference set for one operational case (e.g., "at home"), and another preference set for another case (e.g., "at the office"). The CPC-BS could then utilize knowledge of these preference sets to adjust delivery/grouping of context information.

As an alternative, or in addition to the user class or subscription status methods discussed above, contextual information transmitted over the CPC for information related to specific types of contextual information (e.g. short range RATs) might not be transmitted as often as information for other systems (like cellular, etc.) or other types of services. In this manner, the cycle time (i.e. the delay between transmissions) for the contextual information is increased to ease the burden on CPC bandwidth.

Distributed CPC Provisioning—

Figure 15:
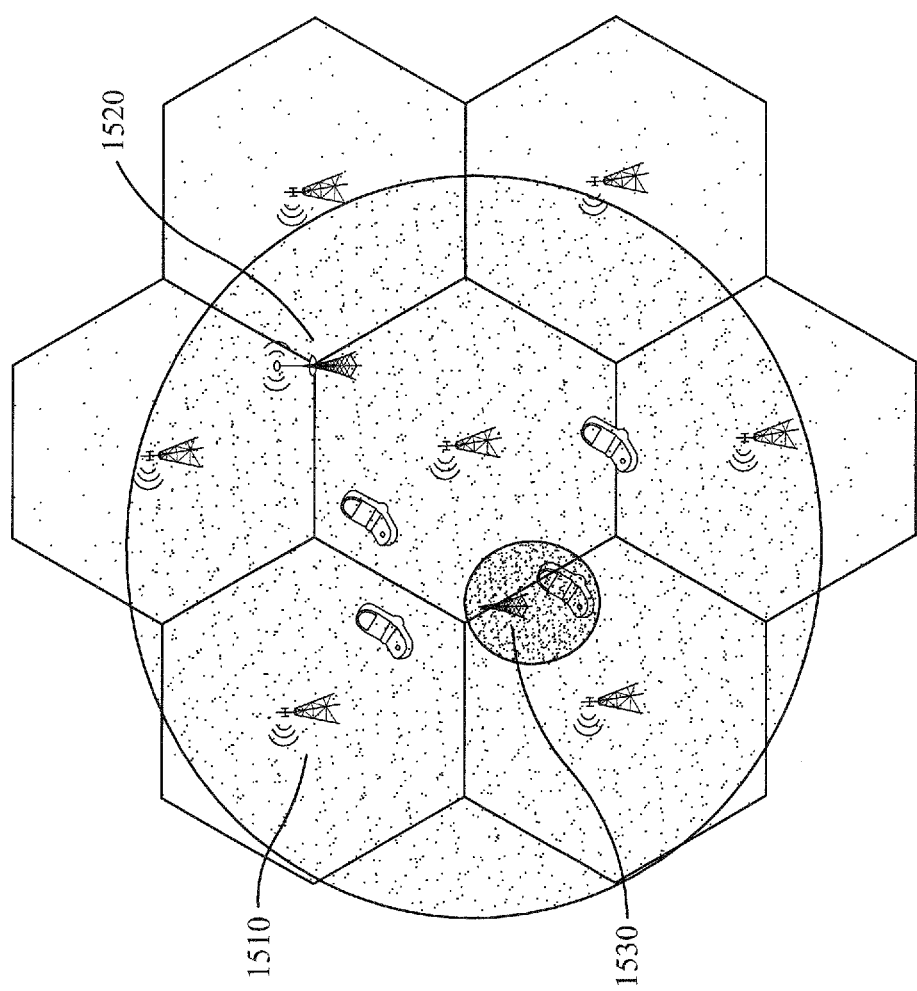
FIG. 15 is a graphical representation of one embodiment of a master/slave CPC deployment in accordance with the present invention.

Referring now to FIG. 15, one exemplary embodiment of a distributed CPC deployment is illustrated and described in detail. The illustrated CPC deployment is distributed within a cellular network comprised of a plurality of macro-cell base stations 1510. The distributed CPC architecture includes a master CPC-BS 1520, along with a slave CPC-BS 1530. The slave CPC-BS may, in an exemplary implementation, exist as part of a femtocell that would reside in relatively close physical proximity with a user's UE 1540. However, it will be recognized that this is in no way a requirement, and the slave CPC-BS could essentially consist of the same physical hardware as the master CPC-BS if desired.

The use of a master-slave relationship among various CPC-BS advantageously provides for the ability to implement a hierarchical approach to CPC distribution (i.e., various distinct CPCs are broadcast over differing CPC-BSs based on, for example, the priority level of the contextual information provided). For various reasons, the master CPC-BS 1520 and slave CPC-BS 1530 are preferably deployed by a single operator in order to, inter alia, facilitate the coordination of distributed contextual information among the two (2) CPC-BSs. This is also helpful in instances where contextual information from the slave CPC-BS contradicts contextual information coming from the master. In those instances, the master CPC-BS contextual information should take priority. It will be appreciated however, that deployments of the two apparatus 1520, 1530 may be accomplished by different and unrelated entities. For example, a master CPC-BS may be configured to broadcast data relating to its contextual information, with the slave CPC-BS merely passively acquiring the data and making use of it where applicable or as it sees fit. The inverse relationship may also be used; i.e., the slave CPC-BSs broadcast their context-related data, and the master makes use of it passively. Other schemes will also be recognized by those of ordinary skill given the present disclosure.

Referring back to the previous RAT notification example (i.e., where the contextual information includes both long range and short range RAT availability), the distribution of the contextual information to a user's UE 1540 can be distributed between the master CPC-BS and the slave CPC-BS. As the slave CPC-BS will in a typical scenario possess only a very limited coverage area, it would be desirable to distribute finer granularity contextual information (such as the availability of short range RATs) via the slave CPC-BS, while maintaining higher level contextual information distribution at the master CPC-BS.

Business Methods and Rules—

It will be recognized that the foregoing network apparatus and methodologies may be readily adapted to various business models. For example, in one such model, the deployment of the CPC-BS network architecture is operator-independent (e.g., through the use of a third-party CPC deployment approach). In one embodiment of such an approach, the CPC service provider is financed by the underlying network service provider based on, for example, the type of information that is being provided. For example, such a scenario would be particularly desirable to network service providers if it can enhance the operation of their networks, thereby adding value to these network service providers by improving their subscriber's perceptions of the network and service that they provide. In one variant, a CPC is transmitted from a base station, the CPC notifying recipients of nearby services that the network operator of the base station additionally supports. For example, such a CPC may indicate the presence of a network operator's WLAN hot spot nearby. Conceivably, by providing easy access to the network operator's other resources, the subscriber may be easily offloaded onto secondary systems to increase network capacity, increase efficiency, etc.

As an alternative, the CPC service provider is paid directly by various ones of UE users who wish to enhance the capabilities of their devices by, for example, regularly obtaining context information about other RATs available to the user within any given geographic location for that user.

In yet another alternative implementation, the CPC service provider is paid by various independent businesses who wish to enhance the experience of the services they offer by providing a dedicated CPC service. For example, recall the hospital example discussed supra, in which the CPC is used to regulate the power output of UEs located on the premises, or the theater/opera house owner who wishes to silence the ringtones of the UEs of its patrons. Furthermore, combinations of the foregoing could be implemented which expand the marketing opportunities for CPC service providers to enhance their revenue.

In another such model, a service provider/network operator may sell, lease, or freely provide (i.e., at no cost, such as via an incentive program) enhanced devices including e.g., femtocells and/or mobile devices or handsets/UEs). Appropriately enabled user equipment may receive enhanced pilot channel messages, and/or more efficiently monitor existing pilot channels, thus increasing the overall perceived quality of a user's experience. In one such embodiment, a dedicated subset of pilot channels are allocated to invention-enabled UEs. Thus, while legacy devices continue to broadly monitor all pilot channels (albeit inefficiently, as previously described herein), invention-enabled devices only monitor the subset of enabled channels, which is markedly more efficient (and considerably improves power consumption in the UE, and UE/network resource allocation).

The aforementioned network apparatus and methodologies may also be readily adapted for operation in accordance with an underlying operational or business rules algorithm or "engine". This business rules engine may comprise for example a software application (and/or firmware, or even hardware aspects), and is implemented in one embodiment as a separate entity at the Core Network, or alternatively within an existing entity residing at the Core Network or other network management process (NMP). The rules engine is in effect a high-layer supervisory process which aids the network operator (or other interested party) in making operational decisions or resource allocations based on important criteria such as financial aspects, user experience enhancement, etc.

In one embodiment, the rules engine is configured to take into account the revenue and/or profit implications associated with providing resources to one or more users. Accordingly, the exemplary rules engine can modify the pilot channel behaviors of the system to support a wider base of users (e.g., providing relatively simple, but high quantities of pilot messages) or alternatively, a wider range of services (e.g., more complex pilot channel messages having a greater or more intricate range of functionalities).

For instance, evaluation of the pilot channel allocations may include an analysis of the incremental cost, revenue, and/or profit associated with the various different allocation options. In some cases, the network provider may determine that new service requests are relatively uncommon, and thus pilot channels are less important. In other cases, the network provider may determine that new users and services are frequently entering and exiting a cell (e.g., such as in the case of a commuter or passenger train which traverses a given cell multiple times a day, and brings with it numerous different users in a short interval of time), thus requiring an allocation of more pilot channel resources. These "rules" may be imposed e.g., at time of resource request, and then maintained for a period of time (or until an event triggering a re-evaluation occurs), or alternatively according to a periodic or schedule model (e.g., during certain hours of the day, days of the week, holidays, etc.).

In another embodiment, certain types of context information may be restricted from, or made useful for business and or accounting methods (e.g., "gold", "silver", "vip", etc.), For example, a subscriber willing to pay more money may be privy to enhanced services. A premium subscriber may receive "gold" or "vip" context information; whereas a less premium subscriber may receive "silver" context information. For example, a wireless hotspot may only provision usage of its resources for "vip" users. Users which are not subscribed to these premium groups would not decode the context information.

In yet other embodiments, cognitive pilot channels may be used for advertising one or more nearby services of interest. Such advertisements may be directly profitable, e.g., as a fee based subscription service, or may be indirectly profitable e.g., attracting customers to a desired area, increasing perceived value of a UE handset.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A context-adaptive base station for use in a wireless network, comprising:
a processing apparatus coupled to both a storage medium and a wireless network interface, the storage medium having at least one computer program stored thereon, the at least one computer program that, when executed by the processing apparatus:
store requests from one or more portable devices, the requests comprising a request for context information from the base station, the context information comprising one or more data payloads useful for identifying information pertinent to one or more aspects of the wireless network or subscriber classes;
determine whether a response to the request for context information should be transmitted; and
where the determination indicates that the response should be transmitted, transmit the response according to a determined message type.

2. The base station of claim 1, wherein the determined message type is selected from the group consisting of a broadcast type, a multi-cast type and a unicast type.

3. The base station of claim 1, wherein the determination of whether the response should be transmitted comprises:
determination of a geographic location of one or more of the requests; and
evaluation of a need for context information based at least in part on the geographic location.

4. The base station of claim 1, wherein the determination of whether the response should be transmitted comprises determination of an operational mode of the network.

5. The base station of claim 4, wherein the operational mode is selected from the group consisting of: (i) a first mode where the base station has knowledge about its served portable devices; (ii) a second mode where the base station has no knowledge about its served portable devices; and (iii) a third mode where the base station has knowledge about only some of the served portable devices.

6. The base station of claim 1, wherein the at least one computer program is further configured to:
receive first context information from the one or more portable devices;
determine whether the first context information requires update; and
where the first context information requires update, cause the transmission of the response.

7. The base station of claim 6, wherein the transmission of the response comprises a transmission of only a changed or updated portion of the context information.

8. The base station of claim 7, wherein the wireless network comprises a cellular network, and the changed or updated portion of the context information is transmitted via a pilot channel resource of the cellular network.

9. A context information system for use in a wireless network, comprising:
a master context information base station;
a slave context information base station; and
a portable device configured to receive context data from both the master context information base station and the slave context information base station;
wherein when a first portion of the received context data conflicts with a second portion of the received context data, the first portion of the received context data is retained or discarded based at least in part on a prioritization of the first and second portions of the context data; and
wherein the context data received is prioritized by the portable device based on a context information base station type that transmitted the context data.

10. The context information system of claim 9, wherein the slave context information base station provides context data over a substantially smaller coverage area as compared with the master context information base station.

11. The contextual information system of claim 9, wherein the first portion of the received context data is generated by the master base station, and the second portion of the received context data is generated by the slave base station, and the first portion of the received context data is retained based at least in part on prioritization of the master base station over the slave base station.

12. The contextual information system of claim 9, wherein the first portion of the received context data is received at a first time, and the second portion of the received context data is generated at a second time earlier than the first time, and the first portion of the received context data is retained based at least in part on prioritization of a more recent first portion.

* * * * *